United States Patent
Lee et al.

(10) Patent No.: US 11,464,007 B2
(45) Date of Patent: Oct. 4, 2022

(54) METHOD AND DEVICE FOR DETERMINING TBS IN NR V2X

(71) Applicant: LG Electronics Inc., Seoul (KR)

(72) Inventors: Jongyoul Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 17/252,696

(22) PCT Filed: Jul. 17, 2019

(86) PCT No.: PCT/KR2019/008826
§ 371 (c)(1),
(2) Date: Dec. 15, 2020

(87) PCT Pub. No.: WO2020/017885
PCT Pub. Date: Jan. 23, 2020

(65) Prior Publication Data
US 2021/0127377 A1    Apr. 29, 2021

(30) Foreign Application Priority Data

Jul. 17, 2018   (KR) .................... 10-2018-0082648

(51) Int. Cl.
*H04W 72/04*    (2009.01)
*H04W 4/40*     (2018.01)
(Continued)

(52) U.S. Cl.
CPC ......... *H04W 72/044* (2013.01); *H04L 5/0048* (2013.01); *H04W 4/40* (2018.02); *H04W 92/18* (2013.01)

(58) Field of Classification Search
None
See application file for complete search history.

(56) References Cited

U.S. PATENT DOCUMENTS

2014/0293811 A1* 10/2014 Rao ..................... H04B 17/309
                                                          370/252
2014/0313985 A1* 10/2014 Nimbalker ........... H04L 1/0025
                                                          370/329
(Continued)

FOREIGN PATENT DOCUMENTS

CA      3041571 A1 *  5/2018   ............ H03M 13/09
CA      3031674 C  *  8/2020   ............. H04J 11/00
(Continued)

OTHER PUBLICATIONS

3rd Generation Partnership Project; Technical Specification Group Radio Access Network, "Evolved Universal Terrestrial Radio Access (E-UTRA); Physical layer procedures (Release 15)," 3GPP TS 36.213, dated Mar. 2018, 502 pages.

(Continued)

*Primary Examiner* — Andrew C Oh
(74) *Attorney, Agent, or Firm* — Fish & Richardson P.C.

(57) ABSTRACT

Provided are a method for performing sidelink transmission by a first device (100) in a wireless communication system, and a device for supporting same. The method comprises the steps of: determining a transport block size (TBS) on the basis of whether at least one of an automatic gain control (AGC) symbol and a guard period (GP) symbol is used for sidelink transmission; and performing the sidelink transmission with respect to a second device (200) on the basis of the determined TBS, wherein the AGC symbol may be a symbol which a first device (100) uses for AGC, and the GP symbol may be a symbol which the first device (100) uses for TX/RX switching.

20 Claims, 31 Drawing Sheets

(51) Int. Cl.
*H04L 5/00* (2006.01)
*H04W 92/18* (2009.01)

(56) References Cited

U.S. PATENT DOCUMENTS

| | | | | |
|---|---|---|---|---|
| 2015/0271802 | A1* | 9/2015 | Kang | H04L 27/34 |
| | | | | 370/329 |
| 2016/0359718 | A1* | 12/2016 | Banerjee | H04B 17/309 |
| 2018/0063839 | A1* | 3/2018 | Jung | H04L 27/261 |
| 2018/0176043 | A1 | 6/2018 | Kim et al. | |
| 2018/0176058 | A1 | 6/2018 | Kim et al. | |
| 2018/0317225 | A1* | 11/2018 | Akkarakaran | H04W 72/042 |
| 2020/0137536 | A1* | 4/2020 | Nguyen | H04L 1/1642 |
| 2020/0177308 | A1* | 6/2020 | Lee | H04L 5/0051 |

FOREIGN PATENT DOCUMENTS

| | | | | |
|---|---|---|---|---|
| CN | 101651515 A * | 2/2010 | | |
| CN | 110547018 A * | 12/2019 | | H04L 27/261 |
| CN | 110583038 A2 * | 12/2019 | | H04L 5/0053 |
| EP | 2560451 A2 * | 2/2013 | | H04B 7/14 |
| JP | 2018029323 A * | 2/2018 | | H04L 1/0026 |
| JP | 2019186675 A * | 10/2019 | | H04W 72/042 |
| JP | 2019193193 A * | 10/2019 | | H04L 1/0003 |
| JP | 2019193194 A * | 10/2019 | | H04L 1/0004 |
| JP | 6749491 B2 * | 9/2020 | | H04B 7/212 |
| JP | 6972161 B2 * | 11/2021 | | H04L 1/0003 |
| WO | WO-2010073468 A1 * | 7/2010 | | H04J 11/0069 |
| WO | WO-2010073992 A1 * | 7/2010 | | H04L 1/0026 |
| WO | WO-2010074004 A1 * | 7/2010 | | H04L 1/0003 |
| WO | WO-2011025433 A1 * | 3/2011 | | H04B 17/391 |
| WO | WO-2016108456 A1 * | 7/2016 | | H04L 5/0048 |
| WO | WO-2016123402 A1 * | 8/2016 | | H04L 27/0006 |
| WO | WO-2016180097 A1 * | 11/2016 | | H04B 7/0626 |
| WO | WO2017134238 | 8/2017 | | |
| WO | WO-2017134238 A1 * | 8/2017 | | H04L 1/0002 |
| WO | WO-2017175819 A1 * | 10/2017 | | H04L 1/0005 |
| WO | WO-2017183252 A1 * | 10/2017 | | H04B 7/068 |
| WO | WO2017194162 | 11/2017 | | |
| WO | WO-2018012424 A1 * | 1/2018 | | H04L 27/2613 |
| WO | WO-2018012614 A1 * | 1/2018 | | H04W 72/02 |
| WO | WO2018030949 | 2/2018 | | |
| WO | WO-2018172939 A1 * | 9/2018 | | H04L 1/0003 |
| WO | WO-2018174564 A1 * | 9/2018 | | H04L 1/00 |
| WO | WO-2018229691 A * | 12/2018 | | H04L 1/0005 |
| WO | WO-2018229692 A1 * | 12/2018 | | H04L 1/0003 |

OTHER PUBLICATIONS

3rd Generation Partnership Project; Technical Specification Group Radio Access Network, "NR; Physical layer procedures for data (Release 15)," 3GPP TS 38.214, dated Jun. 2018, 95 pages.
Nokia, Alcatel-Lucent Shanghai Bell, "Further Discussion On short TTI," 1-1708560, 3GPP TSG RAN WG1 Meeting #89, Hangzhou, P.R. China, dated May 15-19, 2017, 8 pages.
ZTE, Sanechips, "Support for 64-QAM," R1-1801474, 3GPP TSG RAN WG1 Meeting #92, Athens, Greece, dated Feb. 26-Mar. 2, 2018, 3 pages.
EP Office Action in European Appln. No. 19838855.5, dated Jun. 11, 2021, 8 pages.
Intel Corporation, "Support of 64QAM for LTE V2V sidelink communication," R1-1717332, Presented at 3GPP TSG RAN WG1 Meeting #90bis, Prague, Czech Republic, Oct. 9-13, 2017, 8 pages.

* cited by examiner

FIG. 9
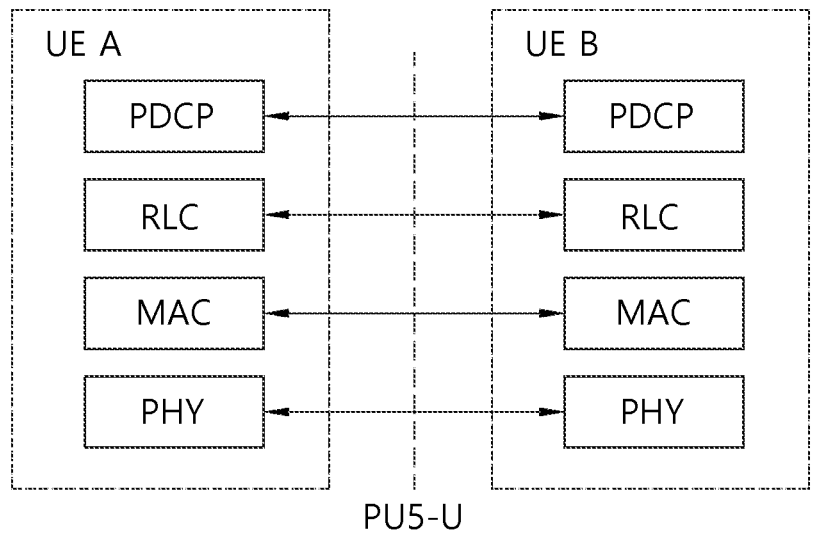
(a)
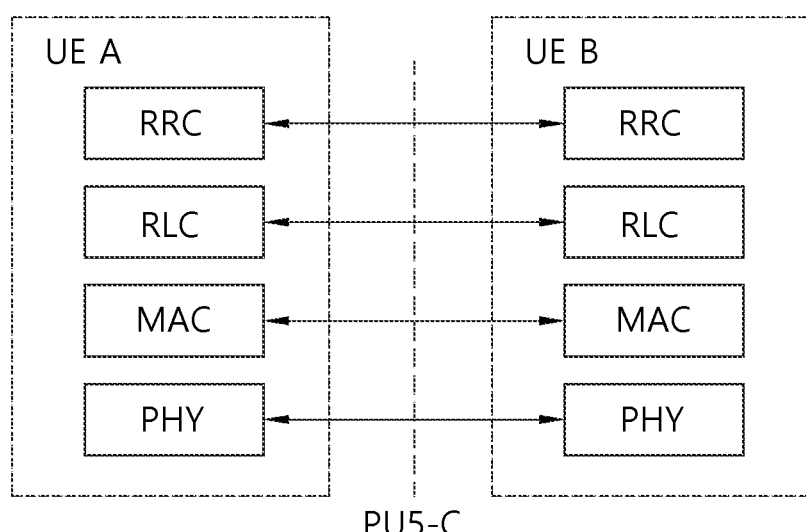
(b)

FIG. 10
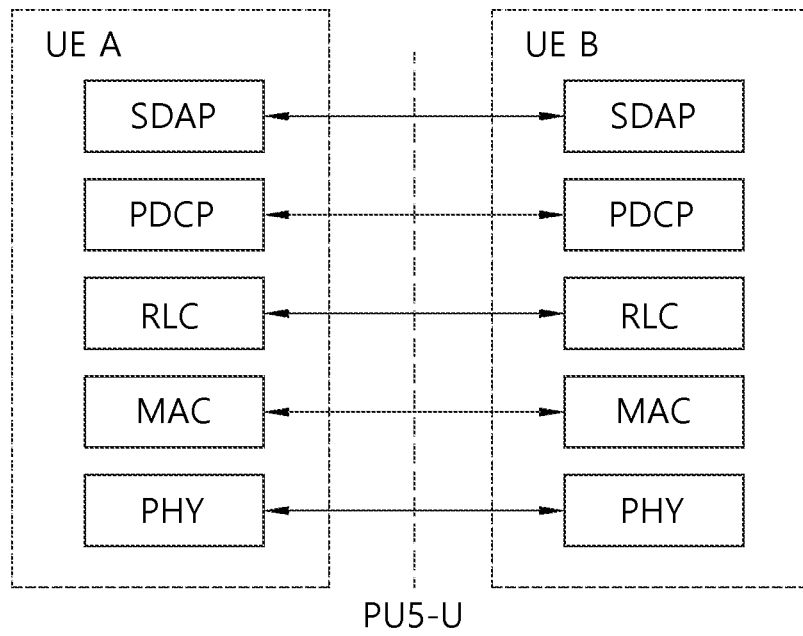
(a)
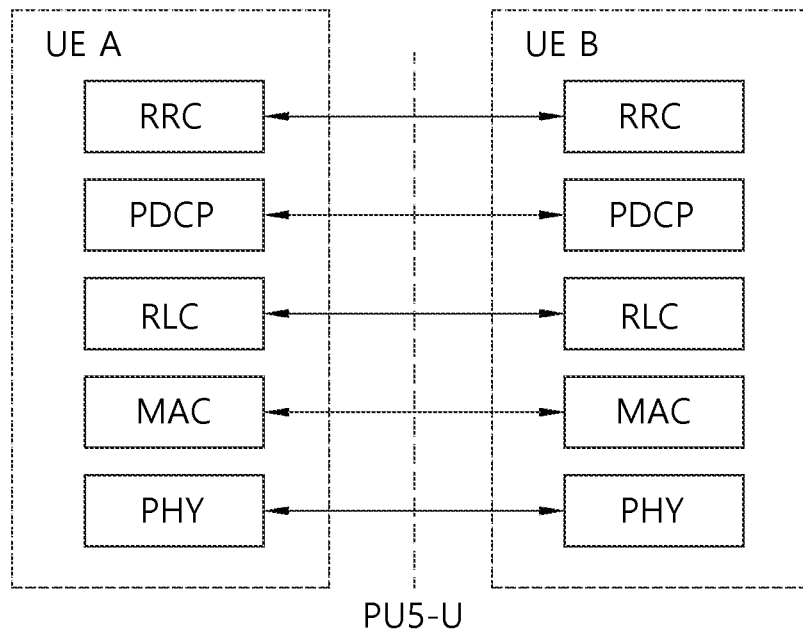
(b)

FIG. 16
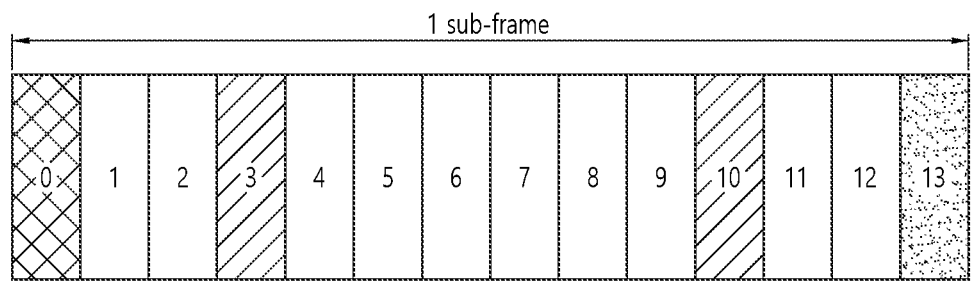
(a) DMRS location for Rel. 12/13 PSCCH/PSSCH
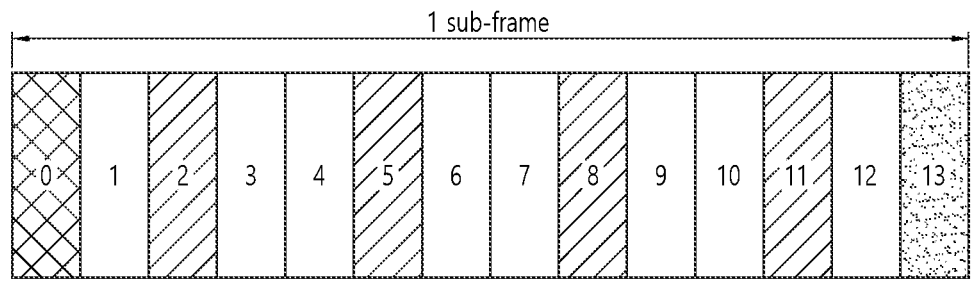
(b) DMRS location for V2V PSCCH/PSSCH
: AGC   : Data symbol   : DMRS symbol   : GP

METHOD AND DEVICE FOR DETERMINING TBS IN NR V2X

CROSS-REFERENCE TO RELATED APPLICATIONS

This application is a National Stage application under 35 U.S.C. § 371 of International Application No. PCT/KR2019/008826, filed on Jul. 17, 2019, which claims the benefit of Korean Patent Application No. 10-2018-0082648 filed on Jul. 17, 2018. The disclosures of the prior applications are incorporated by reference in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

FIG. 1 shows examples of 5G usage scenarios to which the technical features of the present disclosure can be applied. The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some usage cases may require multiple areas for optimization and, other usage cases may only focus on only one key performance indicator (KPI). 5G is to support these various usage cases in a flexible and reliable way.

eMBB focuses on across-the-board enhancements to the data rate, latency, user density, capacity and coverage of mobile broadband access. The eMBB aims approximately 10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special usage case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another usage case is augmented reality and information retrieval for entertainment. Here, augmented reality requires very low latency and instantaneous data amount.

mMTC is designed to enable communication between devices that are low-cost, massive in number and battery-driven, intended to support applications, such as smart metering, logistics, and field and body sensors. mMTC aims approximately 10 years on battery and/or approximately 1 million devices/km². mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims approximately 1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of usage cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many usage cases for mobile communications to vehicles. For example, entertainment for passengers demands high capacity and high mobile broadband at the same time. This is because future users will continue to expect high-quality connections regardless of their location and speed. Another usage case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters, such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important usage cases of mobile communications that enable tracking of inventory and packages anywhere using location-based information systems. Usage cases of logistics and freight tracking typically require low data rates, but require a large range and reliable location information.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, in case of NR sidelink or NR V2X, a user equipment (UE) needs to consider a symbol for DM-RS, an AGC symbol, and/or a GP symbol during a TBS determination process. Therefore, a TBS determination method considering a symbol for DM-RS, an AGC symbol, and/or a GP symbol needs to be proposed.

Technical Solutions

According to an embodiment, proposed herein is a method for performing sidelink transmission, by a first device (100), in a wireless communication device. The method may include the steps of determining a Transport Block Size (TBS) based on whether or not at least one of an Automatic Gain Control (AGC) symbol or a Guard Period (GP) symbol is to be used for the sidelink transmission, and performing the sidelink transmission for a second device (200), based on the determined TBS, wherein the AGC symbol may be a symbol that is used, by the first device (100), for AGC, and wherein the GP symbol may be a symbol that is used, by the first device (100), for TX/RX switching.

According to another embodiment, proposed herein is a first device (100) performing sidelink transmission in a wireless communication system. The first device (100) may include one or more memories, one or more transceivers, and one or more processors being operatively connected to the one or more memories and the one or more transceivers, wherein the one or more processors is configured to determine a Transport Block Size (TBS) based on whether or not at least one of an Automatic Gain Control (AGC) symbol or a Guard Period (GP) symbol is to be used for the sidelink transmission, and to perform the sidelink transmission for a second device (200), based on the determined TBS, wherein the AGC symbol may be a symbol that is used, by the first device (100), for AGC, and wherein the GP symbol may be a symbol that is used, by the first device (100), for TX/RX switching.

Effects of the Disclosure

In sidelink communication, a user equipment (UE) may efficiently determine a TBS.

BRIEF DESCRIPTION OF THE DRAWINGS

FIG. 9 shows a protocol stack for a sidelink communication to which the exemplary embodiment of the present disclosure can be applied.

FIG. 10 shows a protocol stack for a sidelink communication to which the exemplary embodiment of the present disclosure can be applied.

FIG. 16 shows a sidelink frame structure in LTE V2X.

DESCRIPTION OF EXEMPLARY EMBODIMENTS

In this document, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
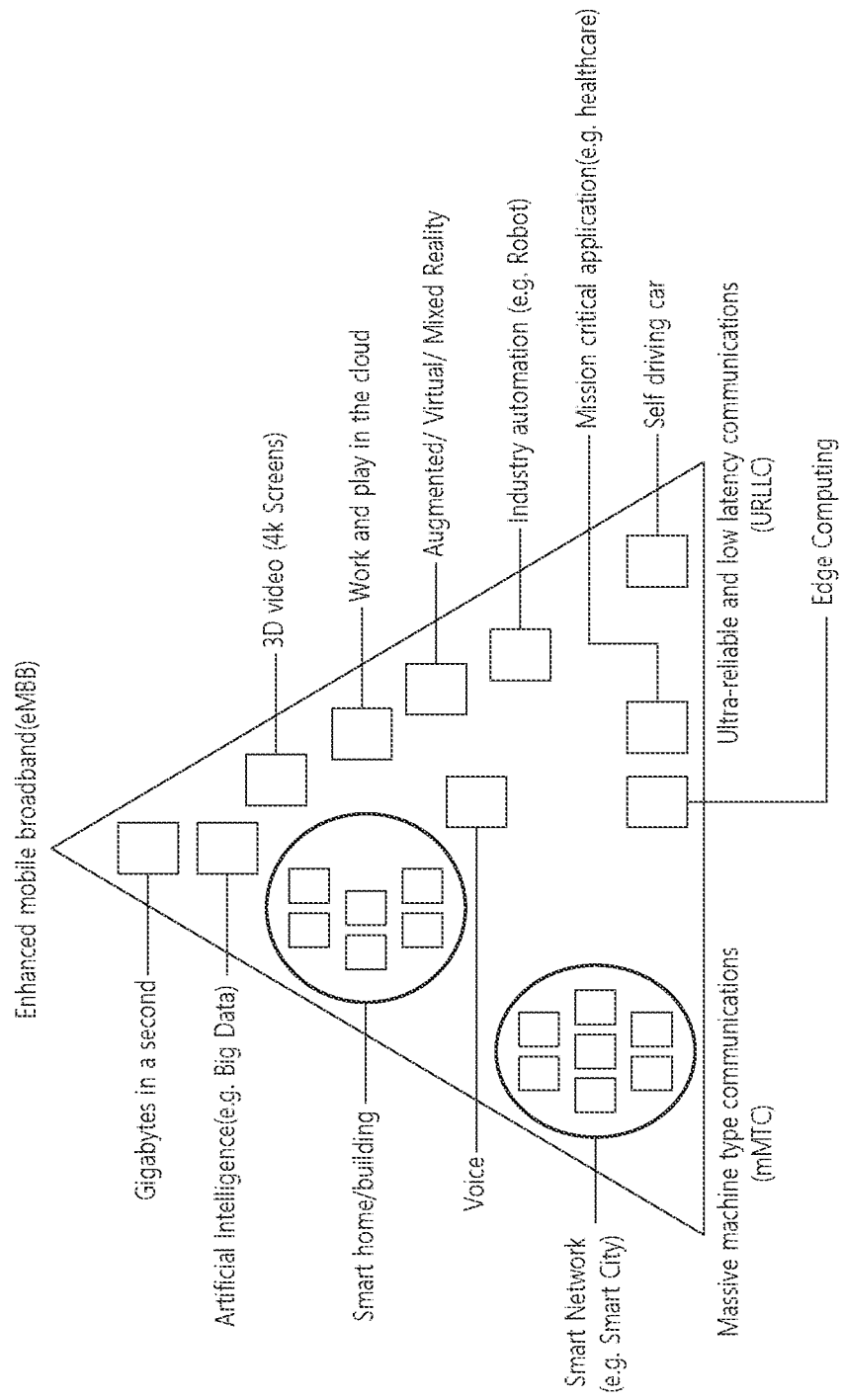
FIG. 1 shows examples of 5G usage scenarios to which the technical features of the present disclosure can be applied.
Figure 2:
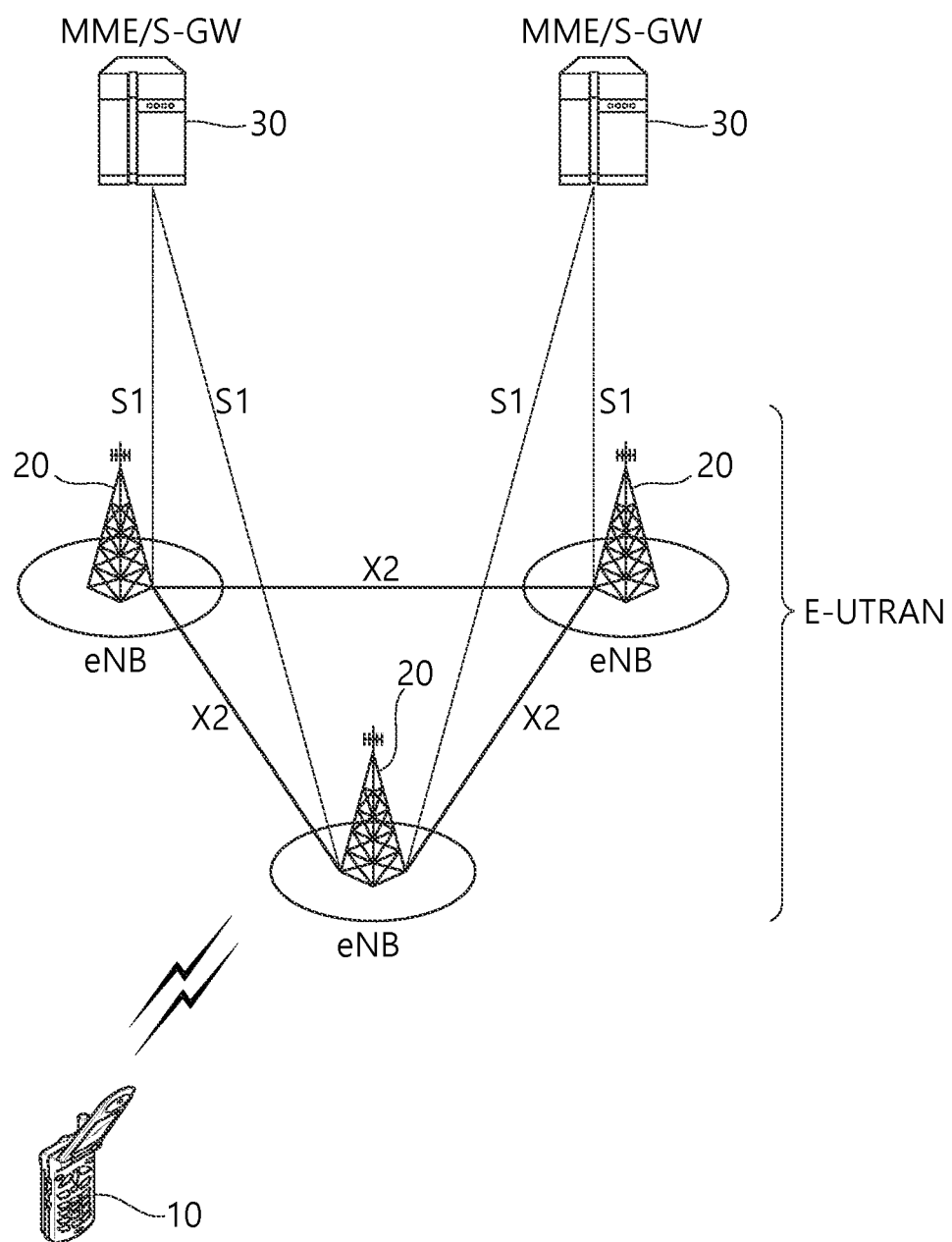
FIG. 2 shows a structure of an LTE system to which an exemplary embodiment of the present disclosure can be applied.

FIG. 2 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 2, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) is connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 3:
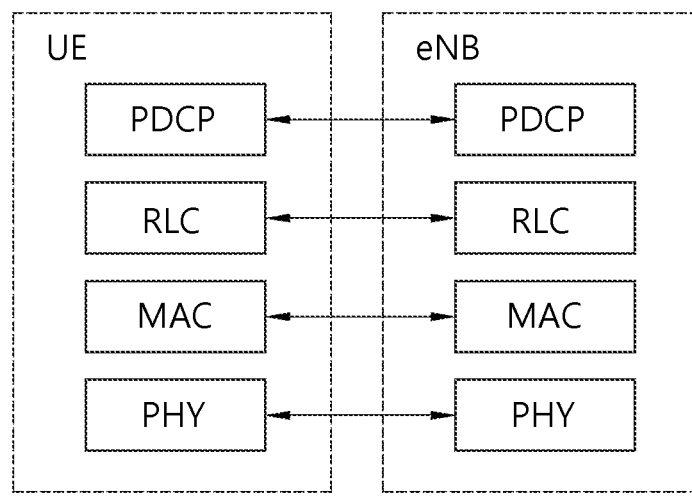
FIG. 3 shows a radio protocol architecture of a user plane to which an exemplary embodiment of the present disclosure can be applied.
Figure 4:
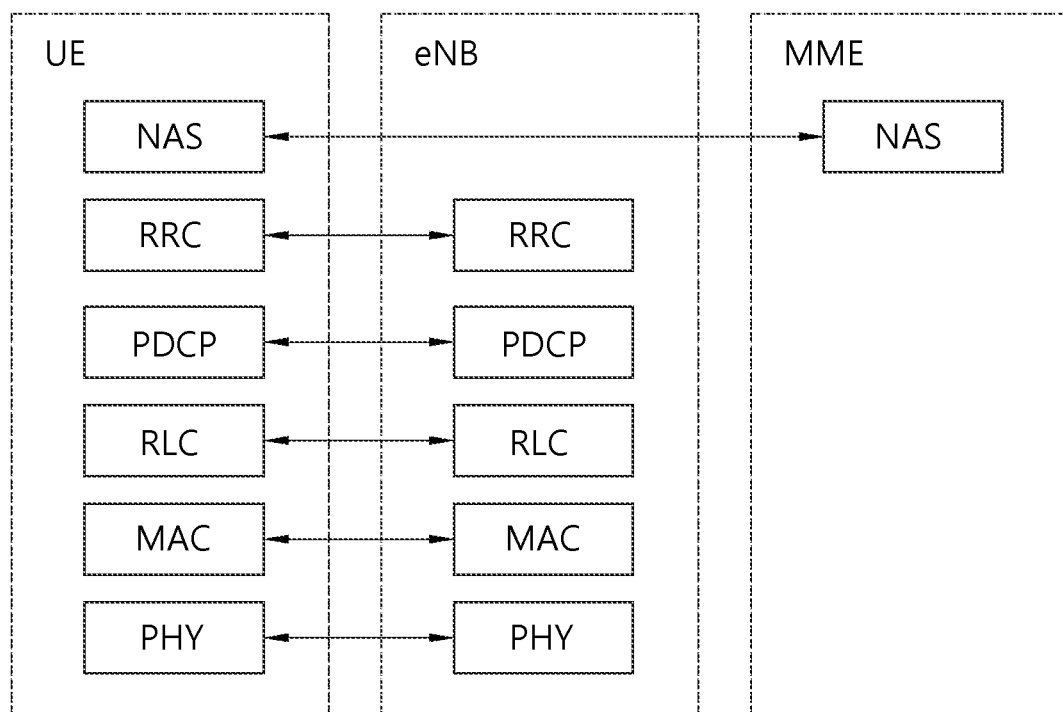
FIG. 4 shows a radio protocol architecture of a control plane to which an exemplary embodiment of the present disclosure can be applied.

FIG. 3 shows a radio protocol architecture of a user plane to which an exemplary embodiment of the present disclosure can be applied. FIG. 4 shows a radio protocol architecture of a control plane to which an exemplary embodiment of the present disclosure can be applied. The user plane is a protocol stack for user data transmission, and the control plane is a protocol stack for control signal transmission.

Referring to FIG. 3 and FIG. 4, a physical (PHY) layer belongs to the L1. A physical (PHY) layer provides an information transfer service to a high layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a high layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of subcarriers in the frequency domain. One subframe is configured of a plurality of OFDM symbols in the time domain. A resource block is configured of a plurality of OFDM symbols and a plurality of subcarriers in resource allocation units. Additionally, each subframe may use specific subcarriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 5:
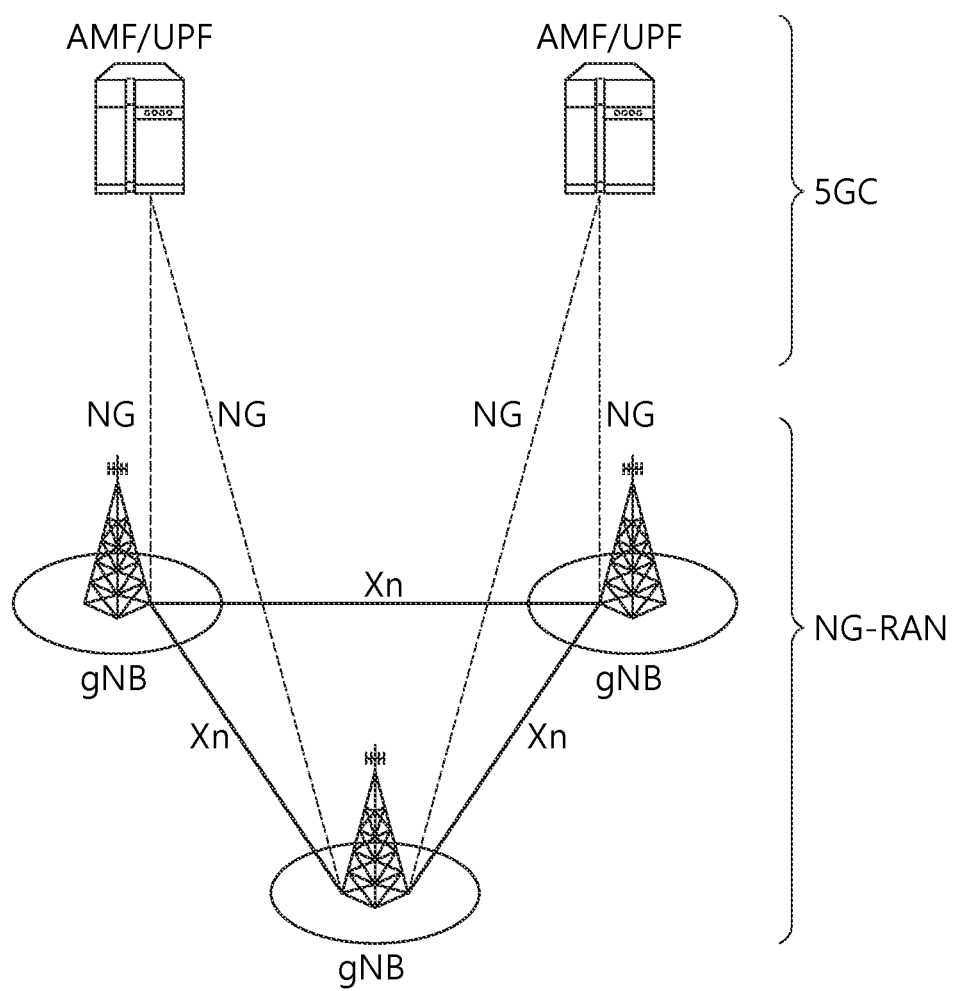
FIG. 5 shows a structure of an NR system to which an exemplary embodiment of the present disclosure can be applied.

FIG. 5 shows a structure of an NR system to which an exemplary embodiment of the present disclosure can be applied.

Referring to FIG. 5, an NG-RAN may include a gNB and/or eNB providing a user plane and control plane protocol termination to a user. FIG. 5 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 6:
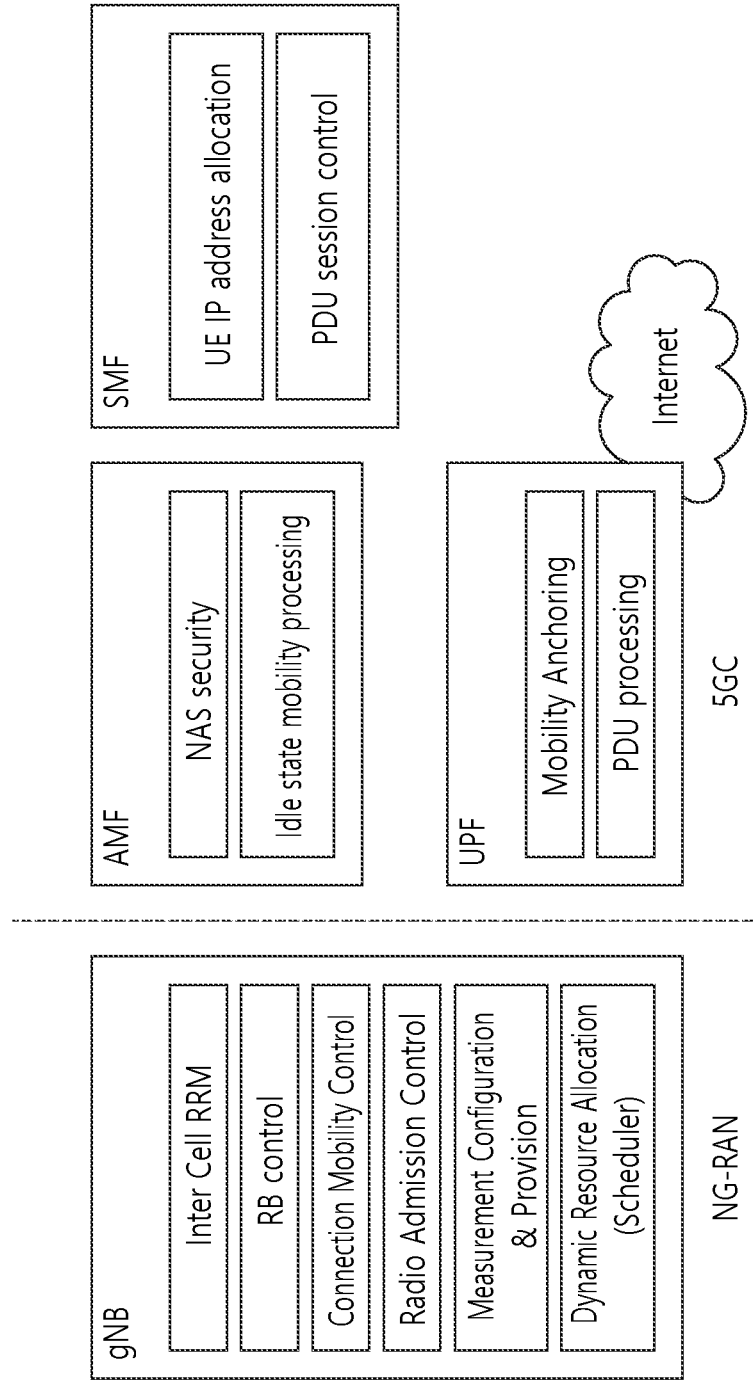
FIG. 6 shows a functional division between an NG-RAN and a 5GC to which an exemplary embodiment of the present disclosure can be applied.

FIG. 6 shows a functional division between an NG-RAN and a 5GC to which an exemplary embodiment of the present disclosure can be applied.

Referring to FIG. 6, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 7:
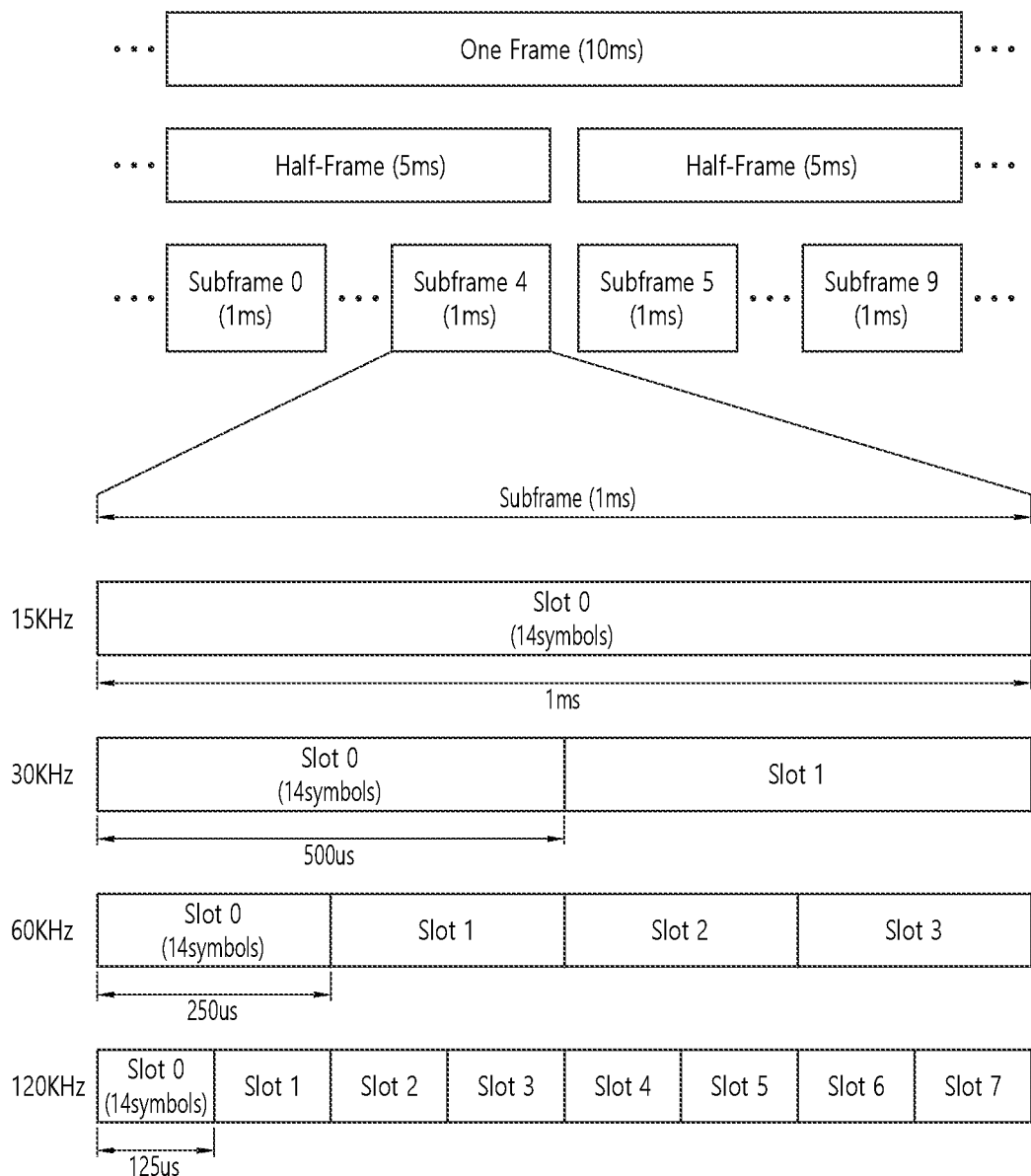
FIG. 7 shows a structure of a radio frame of an NR to which an exemplary embodiment of the present disclosure can be applied.

FIG. 7 shows a structure of a radio frame of an NR to which an exemplary embodiment of the present disclosure can be applied.

Referring to FIG. 7, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 8:
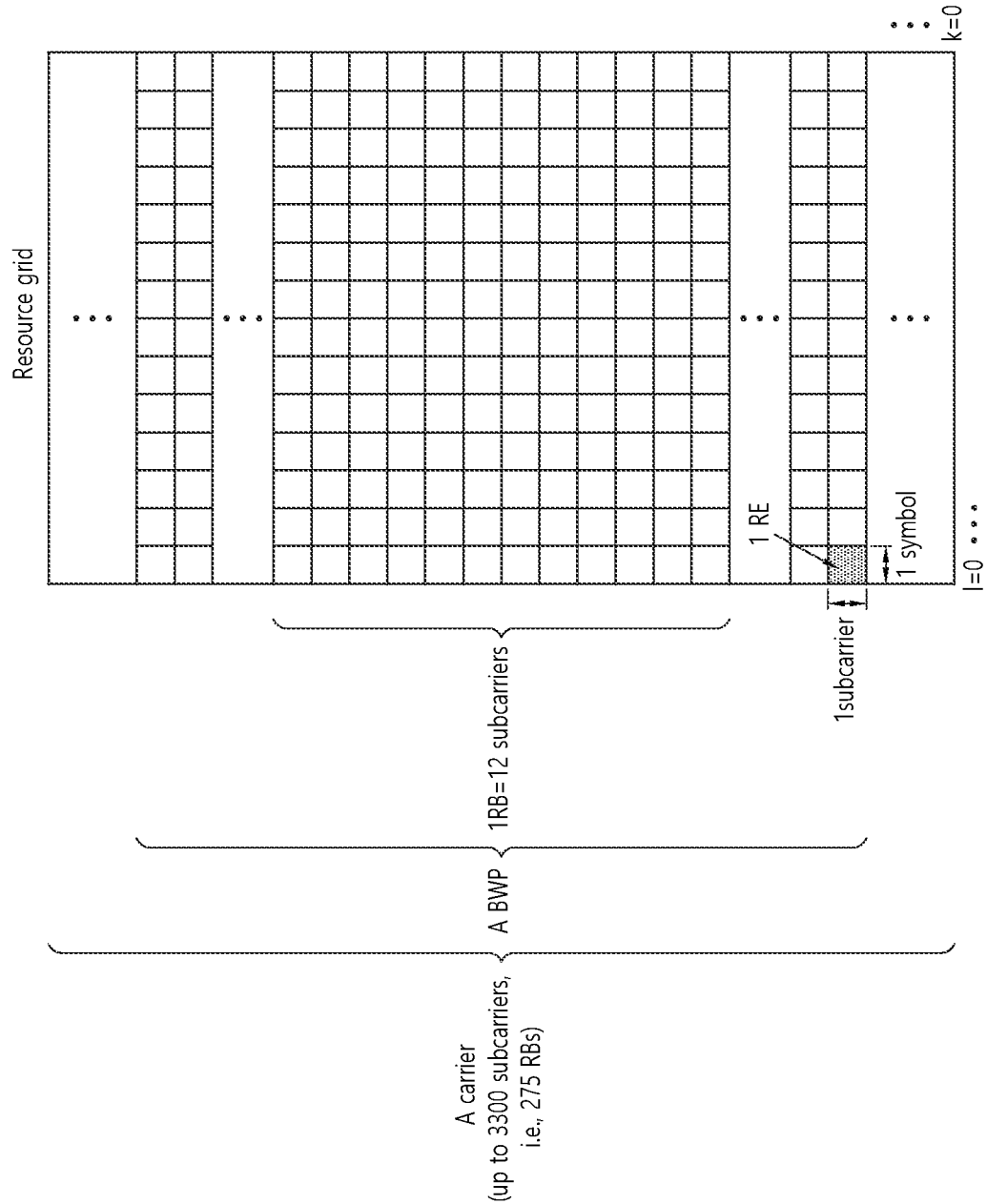
FIG. 8 shows a structure of a slot of an NR frame to which an exemplary embodiment of the present disclosure can be applied.

FIG. 8 shows a structure of a slot of an NR frame to which an exemplary embodiment of the present disclosure can be applied.

Referring to FIG. 8, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

FIG. 9 shows a protocol stack for a sidelink communication to which the exemplary embodiment of the present disclosure can be applied. More specifically, (a) of FIG. 9 represents a user plane protocol stack of LTE, and (b) of FIG. 9 represents a control plane protocol stack of LTE.

FIG. 10 shows a protocol stack for a sidelink communication to which the exemplary embodiment of the present disclosure can be applied. More specifically, (a) of FIG. 10 represents a user plane protocol stack of NR, and (b) of FIG. 10 represents a control plane protocol stack of NR.

Hereinafter, Sidelink Synchronization Signal (SLSS) and synchronization information will be described in detail.

SLSS is a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals is transmitted. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
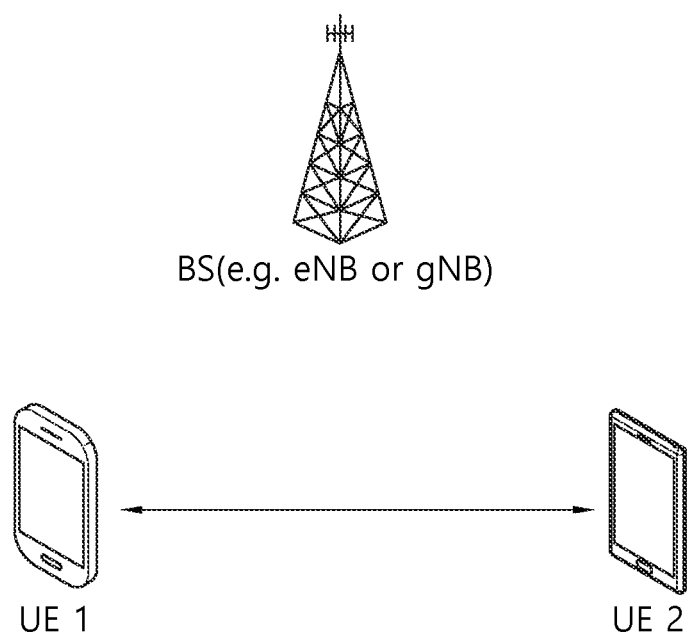
FIG. 11 shows a UE performing V2X or sidelink communication to which an exemplary embodiment of the present disclosure can be applied.

FIG. 11 shows a UE performing V2X or sidelink communication to which an exemplary embodiment of the present disclosure can be applied.

Referring to FIG. 11, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which is a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 12:
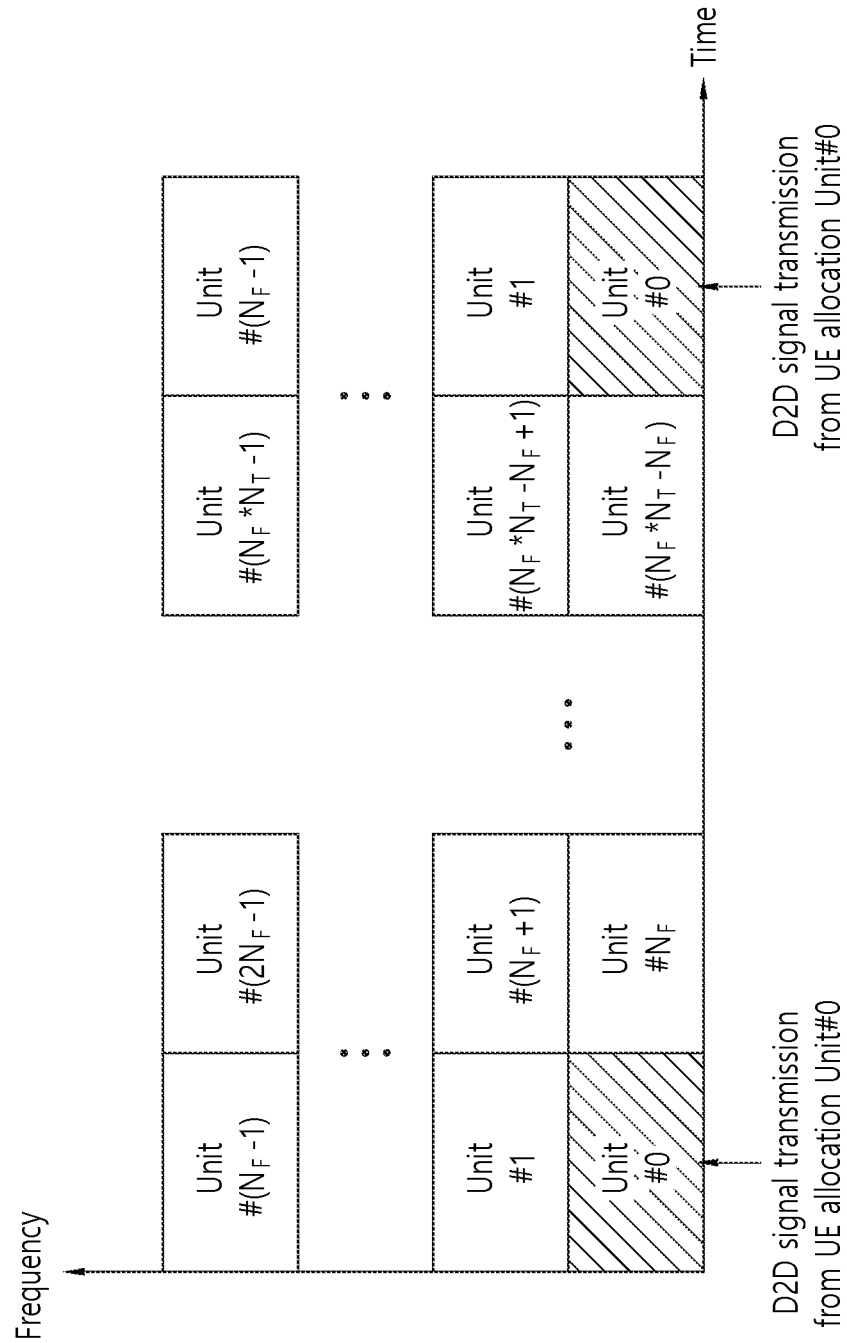
FIG. 12 shows an exemplary configuration of a resource unit to which an exemplary embodiment of the present disclosure can be applied.

FIG. 12 shows an exemplary configuration of a resource unit to which an exemplary embodiment of the present disclosure can be applied.

Referring to FIG. 12, the total frequency resources of the resource pool may be divided into $N_F$ number of resource units, the total time resources of the resource pool may be divided into $N_T$ number of resource units. Therefore, a total of $N_F * N_T$ number of resource units may be defined in the resource pool. FIG. 12 shows an example of a case where the corresponding resource pool is repeated at a cycle of $N_T$ number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 13:
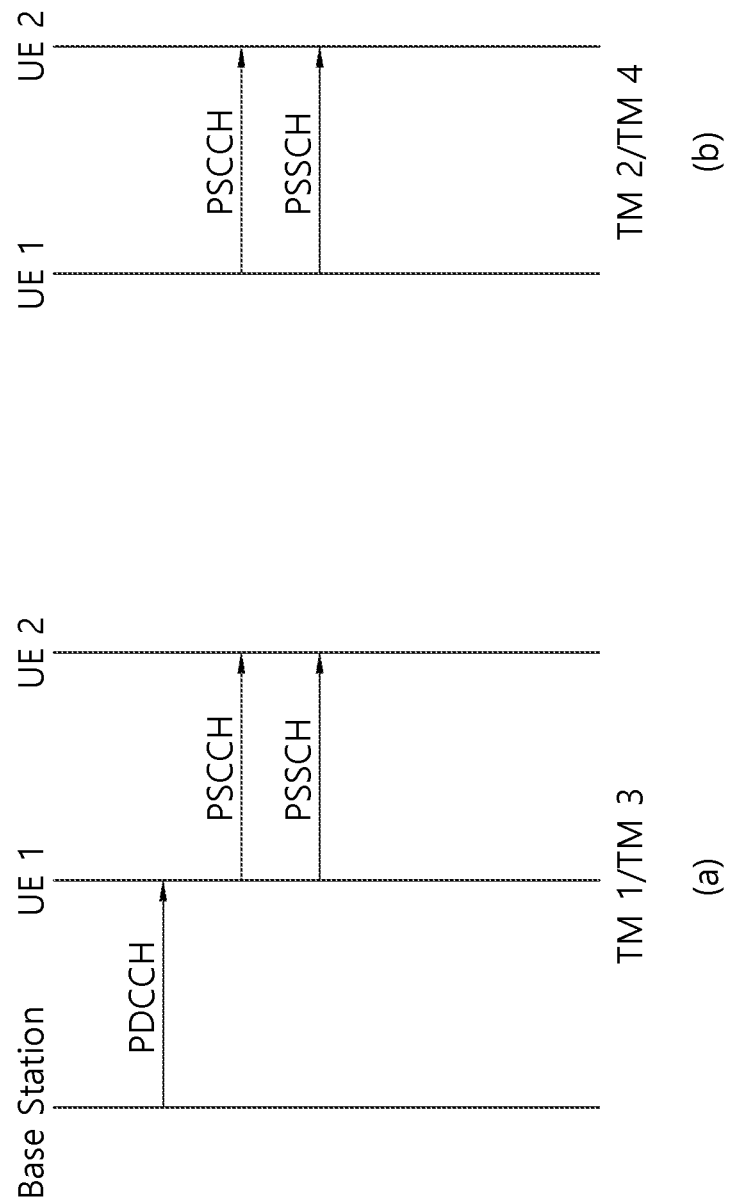
FIG. 13 shows user equipment (UE) operations according to a transmission mode (TM) being related to sidelink/V2X communication to which an exemplary embodiment of the present disclosure can be applied.

FIG. 13 shows user equipment (UE) operations according to a transmission mode (TM) being related to sidelink/V2X communication to which an exemplary embodiment of the present disclosure can be applied.

(a) of FIG. 13 represents UE operations being related to transmission mode 1 or transmission mode 3, and (b) of FIG. 13 represents UE operations being related to transmission mode 2 or transmission mode 4.

Referring to (a) of FIG. 13, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 13, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may be a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Figure 14:
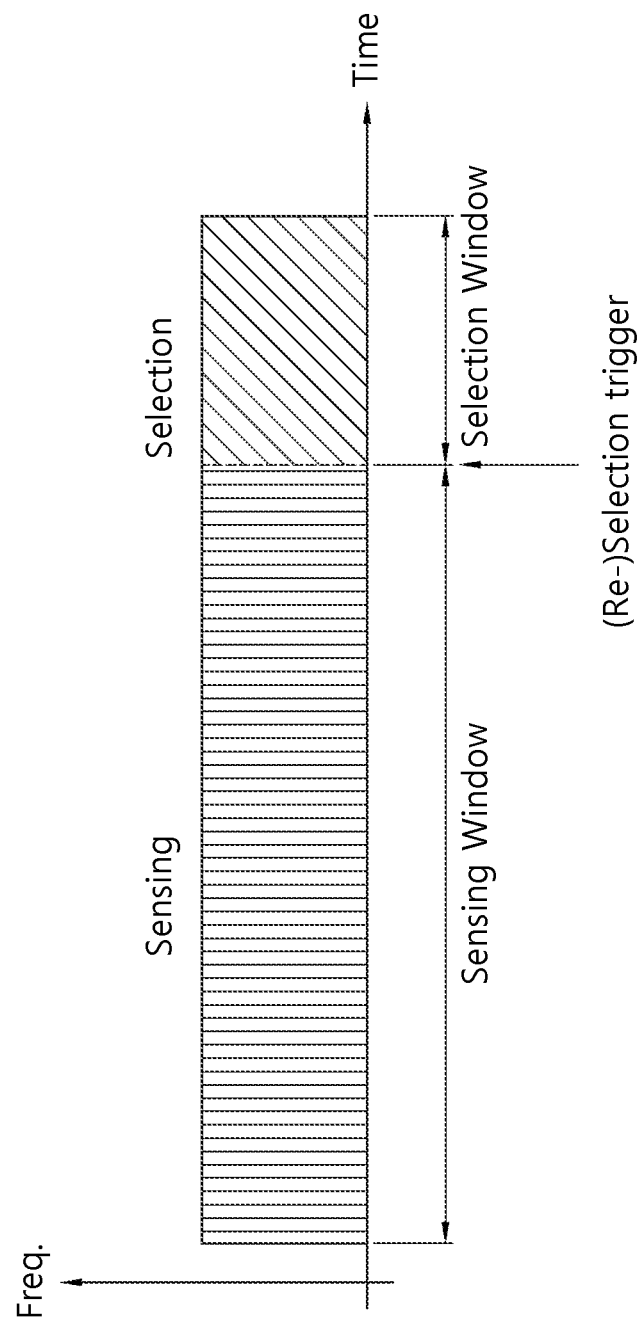
FIG. 14 shows an example where a transmission resource to which an exemplary embodiment of the present disclosure can be applied.

FIG. 14 shows an example where a transmission resource to which an exemplary embodiment of the present disclosure can be applied.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceed a threshold value from the selection window. Thereafter, the UE may randomly select a sidelink resource from the remaining resources within the selection window.

Alternatively, the UE may measure a Received signal strength indication (RSSI) of the periodic resources within the sensing window and may then determine the resources having low interference (e.g., the lower 20% of the resources). Additionally, the UE may also randomly select a sidelink resource from the resources included in the selection window among the periodic resources. For example, in case the UE fails to perform decoding of the PSCCH, the UE may use the above described methods.

Meanwhile, in a wireless communication system, data may be transmitted in Transport Block (TB) units. For example, in an uplink, the UE may determine the size of a transport block in accordance with the procedure, which will hereinafter be described in detail.

In an LTE system of the related art, in order to determine a modulation order ($Q_m$) for PUSCH, a redundancy version, and a transport block (TB) size, the UE may read a 'Modulation and Coding Scheme (MCS) and redundancy version' field (hereinafter, referred to as $I_{MCS}$) in a DCI format. And, the UE may check a 'CSI request' field and calculate a total number of allocated PRB-pairs (this is indicated as $N_{PRB}$). Thereafter, the UE may calculate a number of coded symbols of the control information. The PRB-pair may mean that PRBs of each slot are paired and allocated throughout 2 slots. Hereinafter, for simplicity in the description, the PRB-pair may be abbreviated as PRB.

For example, in case the range of $I_{MCS}$ is $0 \leq IMCS \leq 28$, the modulation order ($Q_m$) may be determined as follows.

If the UE is capable of supporting a 64 quadrature amplitude modulation (64QAM) in a PUSCH and is not configured, by a high layer, to perform transmission only by quadrature phase shift keying (QPSK) and 16QAM, the modulation order may be given by $Q'_m$ of Table 3.

TABLE 3

| MCS Index $I_{MCS}$ | Modulation Order $Q_m$ | TBS Index $I_{TBS}$ | Redundancy Version $rv_{idx}$ |
| --- | --- | --- | --- |
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |

TABLE 3-continued

| MCS Index $I_{MCS}$ | Modulation Order $Q_m$ | TBS Index $I_{TBS}$ | Redundancy Version $rv_{idx}$ |
|---|---|---|---|
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |

TABLE 3-continued

| MCS Index $I_{MCS}$ | Modulation Order $Q_m$ | TBS Index $I_{TBS}$ | Redundancy Version $rv_{idx}$ |
|---|---|---|---|
| 29 | reserved | | 1 |
| 30 | | | 2 |
| 31 | | | 3 |

If the UE is not capable of supporting 64QAM in PUSCH, or if the UE is configured, by the high layer, to perform transmission only by QPSK and 16QAM, the UE first reads $Q'_m$ by Table 3, and, then, the modulation order $Q_m$ may be configured as min(4, $Q'_m$). min(a, b) indicates a smaller value between a and b. If a 'ttiBundling' parameter, which is being provided by the high layer, is set to be 'true', a resource allocation size may be limited to $N_{PRB} \leq 3$, and the modulation order ($Q_m$) may be set to 2.

The UE may determine a redundancy version ($rv_{idx}$) that is to be used in PUSCH based on $I_{MCS}$ and Table 3.

Additionally, the transport block size may be determined as follows. For example, in case the range of $I_{MCS}$ is $0 \leq IMCS \leq 28$, the UE may first determine a Transport Block Size (TBS) index ($I_{TBS}$) based on $I_{MCS}$ and Table 3. For $1 \leq N_{PRB} \leq 110$, the transport block size may be given as shown in Table 4 in accordance with $I_{TBS}$ and $N_{PRB}$. Herein, Table 4 is a table for $1 \leq N_{PRB} \leq 10$, which indicates only part of $1 \leq N_{PRB} \leq 110$ for simplicity. For the remaining part, i.e., $11 \leq N_{PRB} \leq 110$, $N_{PRB}$ may be given as shown in Table 4.

TABLE 4

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

In summary, in the related art LTE system, in order to determine the size of information for MAC Packet Data Unit (PDU) transmission, for example, the UE may perform the above-described TBS determination procedure. That is, a table for determining a TBS may be defined, and parameters for determining a TBS value in the table presented above may be a number of Resource Blocks (RBs) and Modulation and Coding Scheme (MCS), and so on, being allocated to the UE. Therefore, the UE may determine values corresponding to the above-described parameters as transmission TBS in the corresponding TTI. More specifically, in the LTE system, reference may be made to 3GPP TS 36.213 V15.1.0 for the TBS determination method of the UE.

In an NR system, the UE may perform a TBS determination procedure for MAC PDU transmission. Unlike in the LTE system, since flexible TTI and time domain resource allocation are adopted in the NR system, the UE may determine a TBS based on equations and not based on tables. Nevertheless, in case an intermediate number of information bits is less than a specific value (e.g., 3824), the UE may also determine a TBS based on Table 5. More specifically, in the NR system, reference may be made to 3GPP TS 38.214 V15.2.0 for the TBS determination procedure of the UE.

Hereinafter, a TBS determination procedure of a UE in an NR system will be briefly described.

Firstly, in a first phase (or step), the UE may determine a number of REs ($N'_{RE}$) allocated for PUSCH within a single Physical Resource Block (PRB). $N'_{RE}$ may be obtained by Equation 1.

$$N'_{RE} = N_{sc}^{RB} \cdot N_{symb}^{sh} - N_{DMRS}^{PRB} - N_{oh}^{PRB} \quad \text{[Equation 1]}$$

Herein, $N^{RB}_{sc}$ may be a number of subcarriers within a frequency domain within a PRB. For example, $N^{RB}_{SC}$ may be equal to 12. $N^{sh}_{symb}$ may be a number of symbols of PUSCH allocation within a slot. $N^{PRB}_{DMRS}$ may be a number of Resource Elements (REs) for DM-RS per PRB during a scheduled duration including an overhead of a DM-RS CDM group. For example, the DM-RS CDM group may be indicated by DCI (e.g., DCI Format 0_0 or 0_1). $N^{PRB}_{oh}$ may be an overhead being configured by a high layer parameter (e.g., Xoh-PUSCH). If a high layer parameter is not configured, $N^{PRB}_{oh}$ may be assumed to be equal to 0.

Thereafter, in a second phase (or step), the UE may determine a total number of REs ($N_{RE}$) being allocated for PUSCH. $N_{RE}$ may be obtained by Equation 2.

$$N_{RE} = \min(156, N'_{RE}) \cdot n_{PRB} \quad \text{[Equation 2]}$$

Herein, $n_{PRB}$ may be a total number of PRBs being allocated for the UE. That is, the UE may obtain $N_{RE}$ by multiplying a smaller number between $N'_{RE}$ and 156 by $n_{PRB}$.

Then, in a third phase (or step), the UE may obtain a number of intermediate information bits ($N_{info}$). $N_{info}$ may be obtained by Equation 3.

$$N_{info} = N_{RE} \cdot R \cdot Q_m \cdot V \quad \text{[Equation 3]}$$

Herein, R may be a code rate, and $Q_m$ may be a modulation order. v may be a number of layers.

Figure 15:
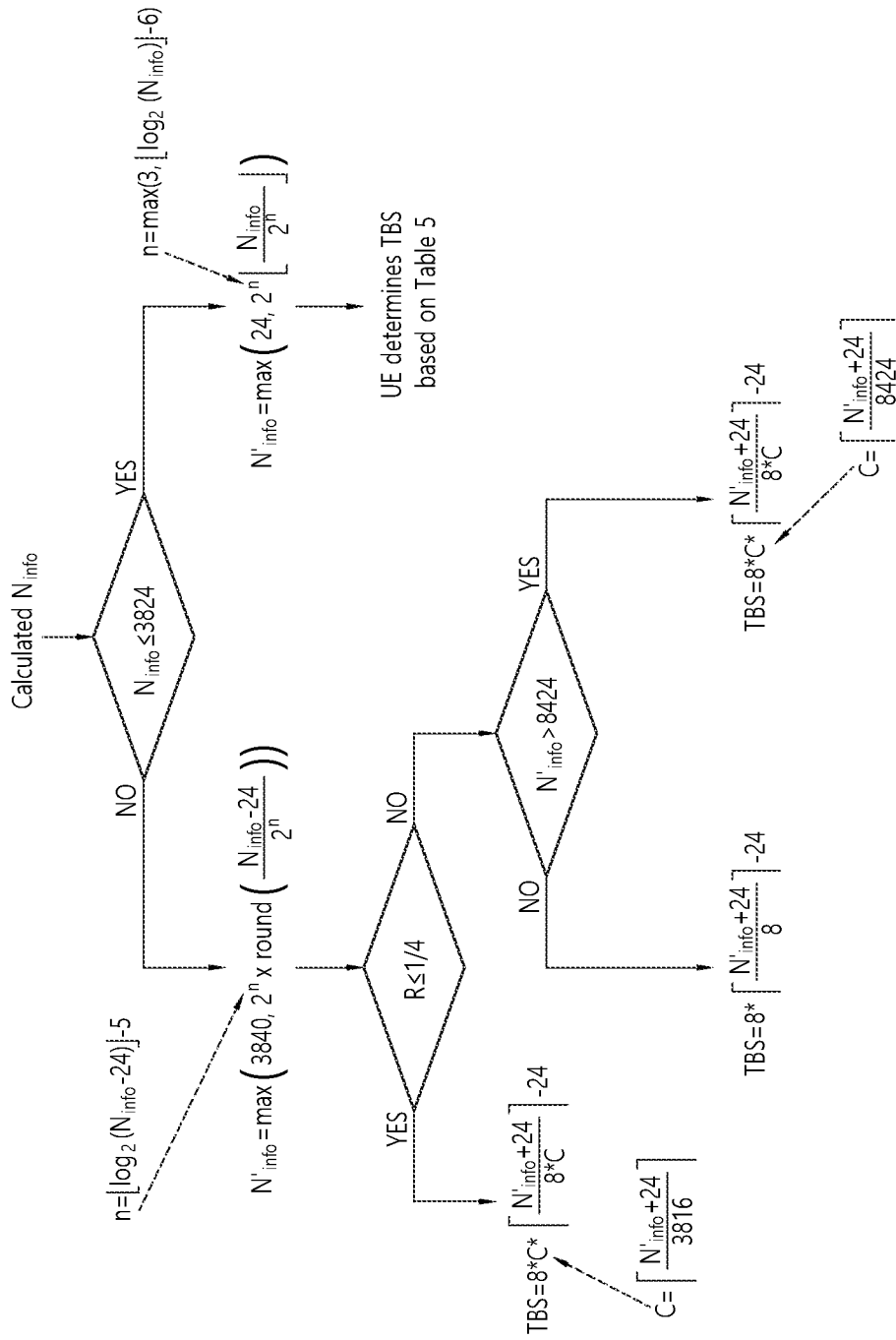
FIG. 15 is a flow chart for TBS determination to which an exemplary embodiment of the present disclosure can be applied.

Finally, in a fourth phase (or step), based on a calculated $N_{info}$, the UE may determine a TBS according to the procedure shown in FIG. 15.

FIG. 15 is a flow chart for a TBS determination to which an exemplary embodiment of the present disclosure can be applied.

In case $N_{info}$ is equal to 3824 or less, the UE may determine the TBS based on Table 5.

TABLE 5

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |

TABLE 5-continued

| Index | TBS |
| --- | --- |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

As described above, in the first phase, the UE may determine/obtain a number of configurable REs in 1 PRB. In the first phase, the UE may not determine/obtain an accurate number of REs. For example, in the first phase, the UE may determine/obtain a coarse number of REs excluding a DM-RS and an overhead (e.g., CSI-RS, and so on) being configured from a high layer.

In the future, also in NR eV2X, the UE shall mandatorily (or essentially) determine a TBS for MAC PDU transmission. That is, the TBS determination procedure may be a mandatory (or essential) procedure also in NR V2X. Meanwhile, in a sidelink resource structure for LTE V2X communication, an Automatic Gain Control (AGC) period and a guard period (GP) are required.

FIG. 16 shows a sidelink frame structure in LTE V2X.

Referring to (a) and (b) of FIG. 16, a first symbol (i.e., Symbol #0) of a subframe may be a symbol for AGC, and a last symbol (i.e., Symbol #13) of the subframe may be a symbol for TX/RX switching. For example, the UE may not be capable of performing sidelink communication in a first symbol for performing AGC. And, for example, the UE may not be capable of performing sidelink communication in a last symbol for TX/RX switching. In this specification, the symbol for AGC may be referred to as an AGC symbol, and a symbol for TX/RX switching may be referred to as a GP symbol.

An overhead by an AGC symbol and/or a GP symbol has caused problems, such as increasing a code rate even in the related art LTE V2X Rel-15 V2X enhancement technology adoption (e.g., 64 QAM support) process. Therefore, in the TBS determination procedure in NR sidelink, the UE needs to consider an overhead by an AGC symbol and/or a GP symbol.

Meanwhile, during the related art V2X Rel-15 V2X enhancement technology adoption process, rate-matching in the last symbol of the subframe was adopted (or introduced) as a mandatory feature. That is, in case of an enhanced UE supporting a standard of 3GPP Rel-15 or higher, a transmitting UE shall perform rate-matching of a guard time for TX/RX switching at a transmitting end. Therefore, in the TBS determination procedure, the last symbol may be considered or may not be counted. In other words, referring to (a) of FIG. 16, in the TBS determination procedure, the UE may consider 4 DM-RSs and a GP for TX/RX switching as an overhead. Therefore, the UE may exclude the overhead from the TBS determination procedure.

Even in case of NR sidelink or NR V2X, the UE needs to consider a symbol for DM-RS, an AGC symbol, and/or a GP symbol in the TBS determination process. Hereinafter, according to an embodiment of the present disclosure, in NR sidelink or NR V2X, a method for determining a TBS by a transmitting UE and a device supporting the same will be described.

Figure 17:
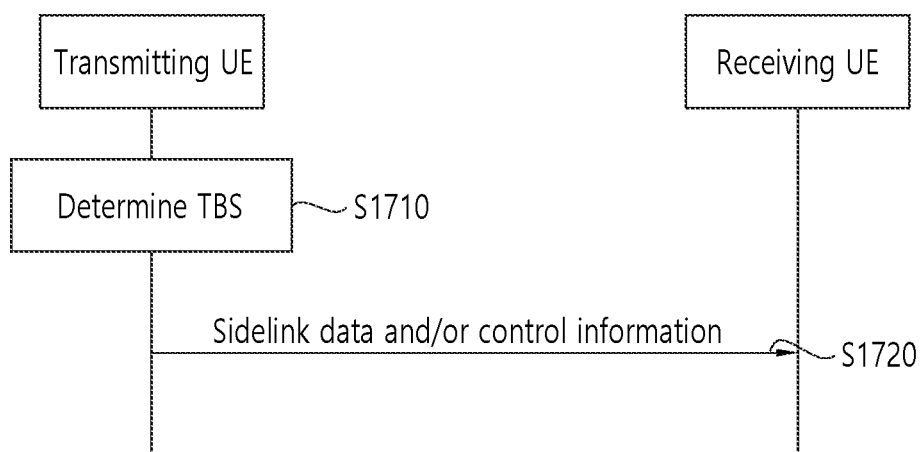
FIG. 17 shows a procedure for transmitting, by a UE, sidelink data and/or control information according to an embodiment of the present disclosure.

FIG. 17 shows a procedure for transmitting, by a UE, sidelink data and/or control information according to an embodiment of the present disclosure.

Referring to FIG. 17, in step S1710, the UE may determine a TBS. For example, firstly, the UE may determine a number of REs being allocated for PSSCH within a single Physical Resource Block (PRB).

(1) TBS determination considering a symbol for TX/RX switching (i.e., GP symbol)

According to an embodiment of the present disclosure, in case the UE determines the number of REs being allocated for PSSCH within a single Physical Resource Block (PRB), an overhead by a GP symbol may be reflected to a high layer parameter. For example, the UE may obtain a number of REs ($N'_{RE}$) being allocated for PSSCH within a single Physical Resource Block (PRB) based on Equation 4.

$$N'_{RE} = N_{sc}^{RB} \cdot N_{symb}^{sh} - N_{DMRS}^{PRB} - N_{oh}^{PRB} \quad \text{[Equation 4]}$$

In Equation 4, $N_{sc}^{RB}$ may be a number of subcarriers in a frequency domain within a PRB. For example, $N_{sc}^{RB}$ may be equal to 12. $N_{symb}^{sh}$ may be a number of symbols being allocated for PSSCH within in a slot. $N_{DMRS}^{PRB}$ may be a number of Resource Elements (REs) for DM-RS per PRB during a scheduled duration including an overhead of a DM-RS CDM group. For example, the DM-RS CDM group may be indicated by SCI.

In Equation 4, $N^1$ oh may be an overhead being configured by a high layer parameter. The high layer parameter may reflect an overhead by a GP symbol. That is, an overhead by a guard time for TX/RX switching in V2X communication may be reflected to the high layer parameter, and the UE may obtain $N'_{RE}$ based on the high layer parameter having the overhead by a GP symbol reflected thereto. For example, $N_{oh}^{PRB}$ may be signaled for the UE through a sidelink high layer parameter. For example, $N_{oh}^{PRB}$ may be signaled for the UE through other high layer parameters. For example, $N_{oh}^{PRB}$ may be signaled for the UE via RRC signaling. For example, $N_{oh}^{PRB}$ may be signaled for the UE through System Information Block (SIB).

Alternatively, according to an embodiment of the present disclosure, in case the UE determines a number of REs being allocated for PSSCH within a single Physical Resource Block (PRB), an overhead by a GP symbol may be reflected to a number of symbols being allocated for PSSCH within a slot. For example, in case the UE calculates resources being available for usage for TBS determination in an NR V2X system, and if the UE shall mandatorily perform a rate-matching operation in a last symbol, the UE may reflect a number of symbols for TX/RX switching to the number of symbols being allocated for PSSCH within a slot. For example, in case the UE determines the number of REs being allocated for PSSCH within a single Physical Resource Block (PRB), the UE may exclude the number of symbols for TX/RX switching from the number of symbols being allocated for PSSCH within a slot. For example, the number of symbols for TX/RX switching may be equal to 1. For example, the UE may obtain the number of REs (N'RE) being allocated for PSSCH within a single Physical Resource Block (PRB) based on Equation 5.

$$N'_{RE} = N_{sc}^{RB} \cdot (N_{symb}^{sh} - 1) - N_{DMRS}^{PRB} - N_{oh}^{PRB} \quad \text{[Equation 5]}$$

In Equation 5, $N_{sc}^{RB}$ may be a number of subcarriers in a frequency domain within a PRB. For example, $N_{sc}^{RB}$ may be equal to 12. $N_{symb}^{sh}$ may be a number of symbols being allocated for PSSCH within in a slot. $N_{DMRS}^{PRB}$ may be a number of Resource Elements (REs) for DM-RS per PRB during a scheduled duration including an overhead of a DM-RS CDM group. For example, the DM-RS CDM group may be indicated by SCI. $N_{oh}^{PRB}$ may be an overhead being configured by a high layer parameter.

Alternatively, in case the UE calculates resources being available for usage for TBS determination in an NR V2X system, if the UE does not perform a rate-matching operation in the last symbol, in Equation 5, ($N^{sh}_{symb}-1$) may be replaced with $N^{sh}_{symb}$.

Meanwhile, according to an embodiment of the present disclosure, among the symbols being allocated for sidelink within a slot, the UE may determine whether or not to use the last symbol (i.e., GP symbol), which is used as a gap for TX/RX switching, for data demodulation. In case of an LTE system, 1 symbol duration may be equal to approximately 70 us, and an actual time for the UE to perform TX/RX switching may be equal to approximately 20 us. Conversely, in case of an NR system, 1 symbol duration may be flexible. However, in case of Frequency Range 1 (FR1), an actual time for the UE to perform TX/RX switching may be equal to approximately 10 us. And, in case of Frequency Range 2 (FR2), an actual time for the UE to perform TX/RX switching may be equal to approximately 5 us. In this specification, a Sub 6 GHz range may be referred to as FR1, and a millimeter wave range may be referred to as FR2. The frequency ranges of FR1 and FR2 may be defined as shown in Table 6.

TABLE 6

| Frequency range designation | Corresponding frequency range |
| --- | --- |
| FR1 | 410 MHz-7125 MHz |
| FR2 | 24250 MHz-52600 MHz |

Accordingly, in order to satisfy a low latency requirement (e.g., less than 10 ms) in an NR V2X system, unless the UE excessively increases the subcarrier spacing by increasing the numerology, the UE may use a duration excluding the time for TX/RX switching from the 1 symbol duration (e.g., 70 us). Additionally, in NR, though a time-domain resource allocation operation, not all symbols may be actually used within one slot, and symbols may be flexibly allocated, such as DL symbols, UL symbols, flexible (F) symbols, and so on. The above-described time-domain resource allocation operation may be used for smaller resources in a V2X communication system, which has an excessive overhead (e.g., DM-RS, AGC duration, TX/RX switching gap). Therefore, this may be disadvantageous to the data mapping of the UE, and the UE may need to perform maximum usage of the last symbol within the slot for the data transmission.

Conversely, in order to satisfy a low latency requirement (e.g., less than 10 ms) in an NR V2X system, the UE may need to increase the subcarrier spacing. In this case, the UE may not be able to use the last symbol (i.e., GP symbol), which is used as the gap for TX/RX switching, for data demodulation.

Figure 18:
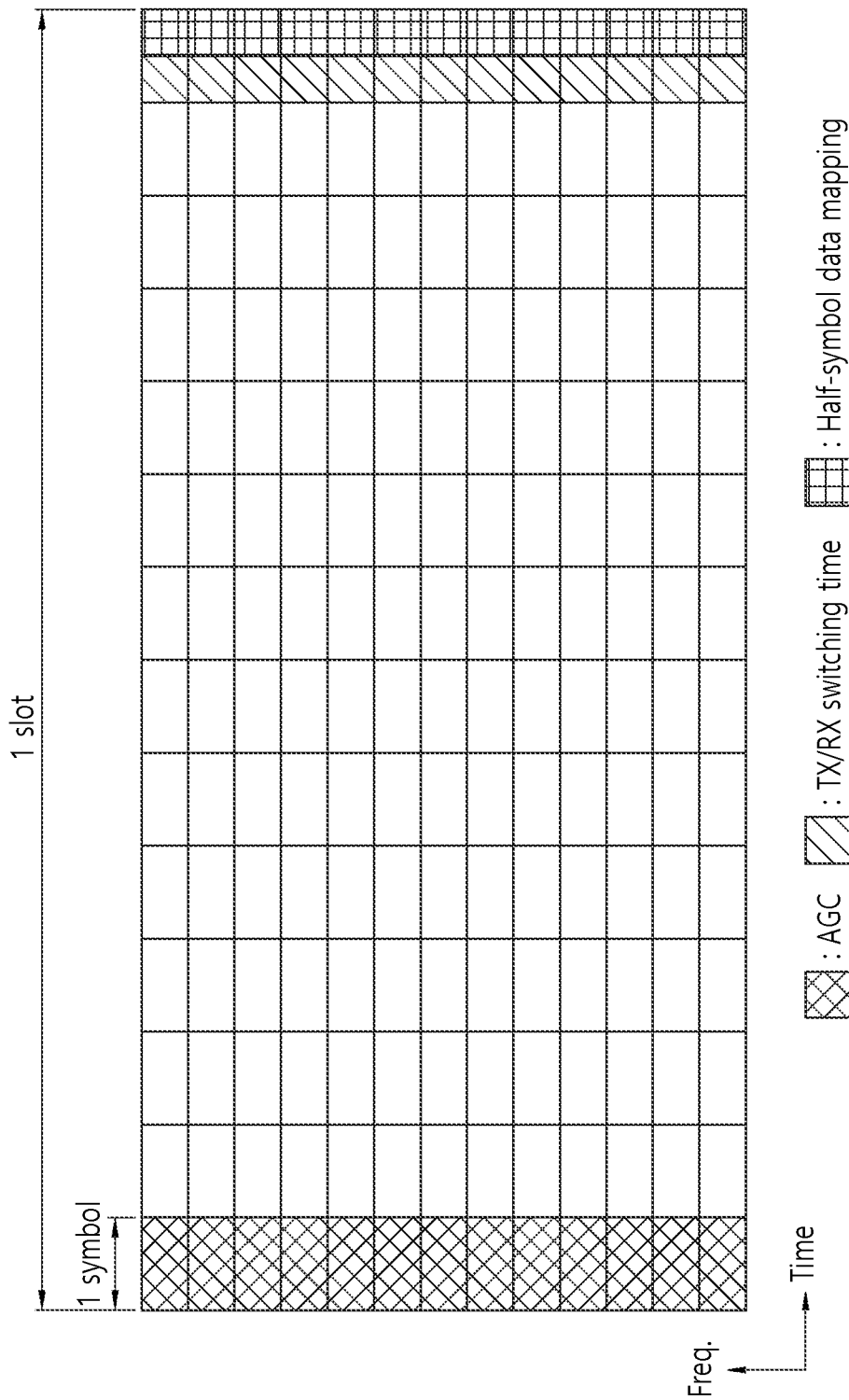
FIG. 18 shows an example of half-symbol (or half-slot) data mapping according to an embodiment of the present disclosure.
Figure 19:
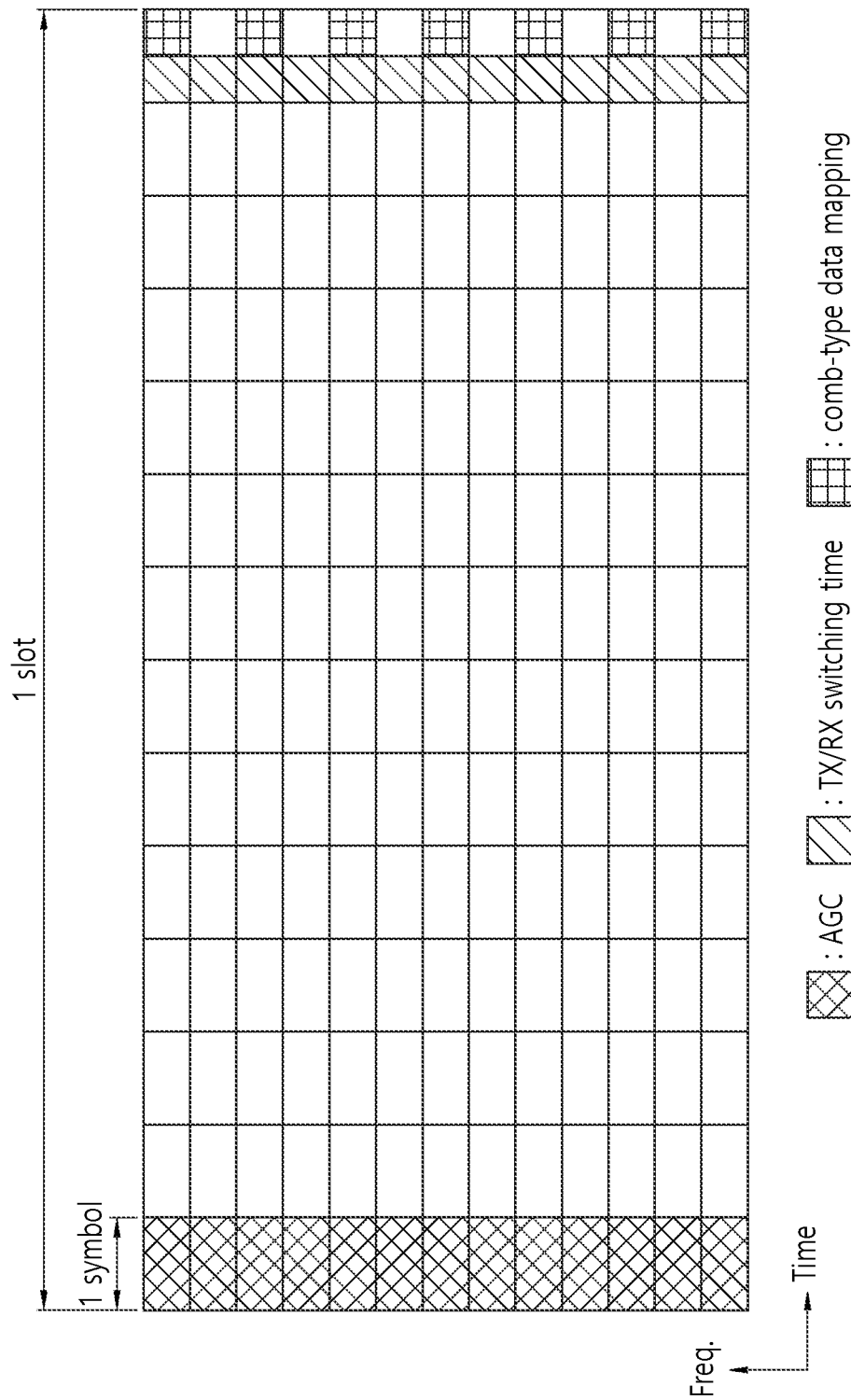
FIG. 19 shows an example of comb-type data mapping according to an embodiment of the present disclosure.

In this specification, the usage of the last symbol (i.e., GP symbol), which is used as the gap for TX/RX switching, by the UE, for data demodulation may include data transmission performed by a transmitting UE on a time excluding the time for TX/RX switching from the last symbol duration, for example, via comb-type data mapping or half-symbol (or half-slot) data mapping, and demodulation of the data, which is performed by a receiving UE, on a time excluding the time for TX/RX switching from the last symbol duration. FIG. 18 shows an example of half-symbol (or half-slot) data mapping according to an embodiment of the present disclosure. FIG. 19 shows an example of comb-type data mapping according to an embodiment of the present disclosure.

Therefore, based on at least one of a numerology of a slot, latency requirement of a packet that is to be transmitted from a slot, a service type being related to a packet that is to be transmitted, or a Frequency Range (FR), the UE may determine whether or not to use the last symbol of the slot for data demodulation (e.g., in a proposed frame structure of the V2X system). For example, the UE may know the latency requirements of a packet that is to be transmitted from a slot through a Packet Delay Budget (PDB) that is interlinked to ProSe Per-Packet Priority (PPPP). For example, the UE may know a service type being related to a packet that is to be transmitted from a slot through an Intelligent Transportation System-Application Identifier (ITS-AID) or Provider Service Identifier (PS-ID), which is capable of identifying a V2X application. After the UE has determined whether or not to use the last symbol of the slot for data demodulation, the UE may reflect the corresponding result to an $N^{sh}_{symb}$ parameter for TBS determination.

For example, if the UE determines to use the last symbol of the slot for data demodulation, the UE may obtain the number of REs (N'RE) being allocated for PSSCH within a single Physical Resource Block (PRB) based on Equation 6.

$$N'^{RE} = N^{RB}_{sc} \cdot N^{sh}_{symb} - N^{PRB}_{DMRS} - N^{PRB}_{oh} \qquad \text{[Equation 6]}$$

In Equation 6, $N^{RB}_{sc}$ may be a number of subcarriers in a frequency domain within a PRB. For example, $N^{RB}_{SC}$ may be equal to 12. $N^{sh}_{symb}$ may be a number of symbols being allocated for PSSCH within in a slot. $N^{PRB}_{DMRS}$ may be a number of Resource Elements (REs) for DM-RS per PRB during a scheduled duration including an overhead of a DM-RS CDM group. For example, the DM-RS CDM group may be indicated by SCI. $N^{PRB}_{oh}$ may be an overhead being configured by a high layer parameter.

For example, if the UE determines to use the last symbol of the slot for data demodulation, the UE may obtain the number of REs being allocated for PSSCH within a single Physical Resource Block (PRB) by reflecting an area to which data is actually mapped. For example, the UE may obtain the number of REs (N'RE) being allocated for PSSCH within a single Physical Resource Block (PRB) based on Equation 7.

$$N'_{RE} = N^{RB}_{sc} \cdot (N^{sh}_{symb} \cdot \alpha) - N^{PRB}_{DMRS} - N^{PRB}_{oh} \qquad \text{[Equation 7]}$$

In Equation 7, $N^{RB}_{sc}$ may be a number of subcarriers in a frequency domain within a PRB. For example, $N^{RB}_{sc}$ may be equal to 12. $N^{sh}_{symb}$ may be a number of symbols being allocated for PSSCH within in a slot. For example, in case of the comb-type data mapping, the UE may multiply a specific coefficient ($\alpha$) by $N^{sh}_{symb}$ according to a repetition factor. For example, the range of a may be $0<\alpha<1$. $N^{PRB}_{DMRS}$ may be a number of Resource Elements (REs) for DM-RS per PRB during a scheduled duration including an overhead of a DM-RS CDM group. For example, the DM-RS CDM group may be indicated by SCI. $N^{PRB}_{oh}$ may be an overhead being configured by a high layer parameter.

For example, if the UE determines not to use the last symbol of the slot for data demodulation, i.e., if the UE all of the last symbol for TX/RX switching, the UE may obtain the number of REs ($N'_{RE}$) being allocated for PSSCH within a single Physical Resource Block (PRB) based on Equation 5.

Additionally, the transmitting UE needs to signal the receiving UE that it has determined the TBS through one of the methods that are proposed above. For example, in a predefined channel, the transmitting UE may notify the receiving UE that is has determined the TBS through one of the methods that are proposed above by using, for example, a specific reserved bit of the PSCCH or a field of a specific PSCCH format.

(2) TBS determination considering a symbol for AGC (i.e., AGC symbol)

According to an embodiment of the present disclosure, in case the UE determines the number of REs being allocated for PSSCH within a single Physical Resource Block (PRB), the UE may consider an overhead by a symbol for AGC (i.e., AGC symbol).

For example, among the symbols being allocated for sidelink within a slot, the UE may determine whether or not to use an AGC symbol for data demodulation. In this specification, the usage of a first symbol being used for AGC (i.e., AGC symbol), by the UE, for data demodulation may include data transmission performed by a transmitting UE on a time excluding the time for AGC from a first symbol duration, for example, via comb-type data mapping or half-symbol (or half-slot) data mapping, and demodulation of the data, which is performed by a receiving UE, on a time excluding the time for AGC from the first symbol duration. For example, in case the UE performs a fast AGC operation in an AGC symbol duration, the UE may use a remaining duration after excluding the time needed for AGC from the AGC symbol duration (e.g., 1 symbol duration) for data demodulation. Conversely, for example, in case a TTI according to a numerology is reduced (or shortened) due to a flexible TTI, which is adopted in NR, the UE may not be capable of performing a fast AGC operation. In this case, the UE may not be able to use the AGC symbol duration for data demodulation. In conclusion, according to the flexible TTI of the NR system, the UE may exclude or include the AGC symbol from or in the process for TBS determination.

For example, in case the UE determines not to use the AGC symbol for data demodulation, the UE may exclude the AGC symbol from the process for TBS determination. For example, the UE may obtain the number of REs ($N'_{RE}$) being allocated for PSSCH within a single Physical Resource Block (PRB) based on Equation 8.

$$N'_{RE}=N_{sc}^{RB} \cdot N_{symb}^{sh}-N_{DMRS}^{PRB}-N_{oh}^{PRB} \quad \text{[Equation 8]}$$

In Equation 8, $N^{RB}_{sc}$ may be a number of subcarriers in a frequency domain within a PRB. For example, $N^{RB}_{SC}$ may be equal to 12. $N^{sh}_{symb}$ may be a number of symbols being allocated for PSSCH within in a slot. $N^{PRB}_{DMRS}$ may be a number of Resource Elements (REs) for DM-RS per PRB during a scheduled duration including an overhead of a DM-RS CDM group. For example, the DM-RS CDM group may be indicated by SCI.

In Equation 8, $N^{PRB}_{oh}$ may be an overhead being configured by a high layer parameter. The high layer parameter may reflect an overhead by an AGC symbol. That is, an overhead by a symbol duration for performing an AGC operation, by the UE, in V2X communication may be reflected to the high layer parameter, and the UE may obtain $N'_{RE}$ based on the high layer parameter having the overhead by an AGC symbol reflected thereto. For example, $N^{PRB}_{oh}$ may be signaled for the UE through a sidelink high layer parameter. For example, $N^{PRB}_{oh}$ may be signaled for the UE through other high layer parameters. For example, $N^{PRB}_{oh}$ may be signaled for the UE via RRC signaling. For example, $N^{PRB}_{oh}$ may be signaled for the UE through System Information Block (SIB).

Alternatively, for example, in case the UE determines not to use the AGC symbol for data demodulation, the UE may exclude the AGC symbol from the process for TBS determination. An overhead by an AGC symbol may be reflected to a number of symbols being allocated for PSSCH within a slot. For example, in case the UE determines a number of REs being allocated for PSSCH within a single Physical Resource Block (PRB), the UE may exclude a number of symbols for AGC from the number of symbols being allocated for PSSCH within a slot. For example, the number of symbols for AGC may be equal to 1. For example, the number of symbols for AGC may be equal to a plurality of symbols. For example, in case the number of symbols for AGC is equal to 1, the UE may obtain the number of REs ($N'_{RE}$) being allocated for PSSCH within a single Physical Resource Block (PRB) based on Equation 9.

$$N'_{RE}=N_{sc}^{RB} \cdot (N_{symb}^{sh}-1)-N_{DMRS}^{PRB}-N_{oh}^{PRB} \quad \text{[Equation 9]}$$

In Equation 9, $N^{RB}_{SC}$ may be a number of subcarriers in a frequency domain within a PRB. For example, $N^{RB}_{SC}$ may be equal to 12. $N^{sh}_{symb}$ may be a number of symbols being allocated for PSSCH within in a slot. $N^{PRB}_{DMRS}$ may be a number of Resource Elements (REs) for DM-RS per PRB during a scheduled duration including an overhead of a DM-RS CDM group. For example, the DM-RS CDM group may be indicated by SCI. $N^{PRB}_{oh}$ may be an overhead being configured by a high layer parameter.

Additionally, in case the UE determines not to use the AGC symbol and GP symbol for data demodulation, the UE may exclude the AGC symbol and GP symbol from the process for TBS determination. In this case, the UE may obtain the number of REs ($N'_{RE}$) being allocated for PSSCH within a single Physical Resource Block (PRB) based on Equation 10.

$$N'_{RE}=N_{sc}^{RB} \cdot (N_{symb}^{sh}-2)-N_{DMRS}^{PRB}-N_{oh}^{PRB} \quad \text{[Equation 10]}$$

In Equation 10, $N^{RB}_{sc}$ may be a number of subcarriers in a frequency domain within a PRB. For example, $N^{RB}_{SC}$ may be equal to 12. $N^{sh}_{symb}$ may be a number of symbols being allocated for PSSCH within in a slot. $N^{PRB}_{DMRS}$ may be a number of Resource Elements (REs) for DM-RS per PRB during a scheduled duration including an overhead of a DM-RS CDM group. For example, the DM-RS CDM group may be indicated by SCI. $N^{PRB}_{oh}$ may be an overhead being configured by a high layer parameter.

Alternatively, for example, in case the UE determines to use the AGC symbol for data demodulation, the UE may include the AGC symbol in the process for TBS determination. For example, the UE may obtain the number of REs ($N'_{RE}$) being allocated for PSSCH within a single Physical Resource Block (PRB) based on Equation 11.

$$N'_{RE}=N_{sc}^{RB} \cdot N_{symb}^{sh}-N_{DMRS}^{PRB}-N_{oh}^{PRB} \quad \text{[Equation 11]}$$

In Equation 11, $N^{RB}_{sc}$ may be a number of subcarriers in a frequency domain within a PRB. For example, $N^{RB}_{SC}$ may be equal to 12. $N^{sh}_{symb}$ may be a number of symbols being allocated for PSSCH within in a slot. $N^{PRB}_{DMRS}$ may be a number of Resource Elements (REs) for DM-RS per PRB during a scheduled duration including an overhead of a DM-RS CDM group. For example, the DM-RS CDM group may be indicated by SCI. $N^{PRB}_{oh}$ may be an overhead being configured by a high layer parameter.

According to an embodiment of the present disclosure, a guard time for TX/RX switching and AGC processing operations may vary specifically in accordance with a resource pool, carrier, and/or service. For example, a resource pool for a legacy UE (e.g., 3GPP Rel-14 UE) and a resource pool for an advanced UE (e.g., Rel-15 UE or UE of a higher standard) may be configured separately. For example, a base station may separately configure resource pools in accordance with the UE capability. Therefore, in case of configuring resource pools, which are separated as described above, signaling or high layer parameters that are needed for the guard time for TX/RX switching and AGC processing operations may be configured in accordance with each resource pool.

Additionally, since a service being supported per carrier, or (even of the carrier is the same) since services that can be supported to advanced UEs differ, the UE capabilities being mapped to each service may vary. For the above-described reason, an overhead may be differently configured in the operation, which is proposed above. Therefore, signaling or high layer parameters that are needed in the proposed operation may be configured per carrier and/or per service.

Additionally, even though a flexible TTI is adopted in NR V2X communication, in order to satisfy the high reliability characteristic of a V2X service, the TTI may be differentiated in accordance with each resource pool, carrier, and/or service. For example, in order to maintain an appropriate data rate and reliability in a specific resource pool, in a specific carrier and/or for a specific service, settings may be configured so as to maintain the current 1 Symbol TTI. For example, in case settings have been configured so as to maintain the current 1 Symbol TTI, the UE may use part (or all) of the AGC symbol and/or GP symbol for data demodulation. Therefore, in the proposed operation, (high layer) parameter or (high layer) signaling may vary.

In this specification, signaling may be a high layer parameter being used in NR or may be a high layer parameter that is additionally adopted for NR V2X. And, signaling may be RRC signaling being UE-specifically transmitted, by the base station, to the UE or may be an SIB being cell-specifically transmitted, by the base station, to the UE. Additionally, in a relay scenario, a master node may perform direct signaling to UEs receiving a neighboring relay through a predefined channel (e.g., PSCCH, PSSCH).

According to various proposed methods or a combination of the various methods, the UE may obtain a number of REs being allocated for PSSCH within a single Physical Resource Block (PRB). Additionally, the UE may obtain a total number of REs being allocated for PSSCH based on Equation 2, or the UE may obtain a number of intermediate information bits based on Equation 3. Additionally, the UE may determine the TBS in accordance with the procedure shown in FIG. 15 based on the intermediate information bits.

Referring back to FIG. 17, in step S1720, the UE may transmit sidelink data and/or control information based on the determined TBS.

Figure 20:
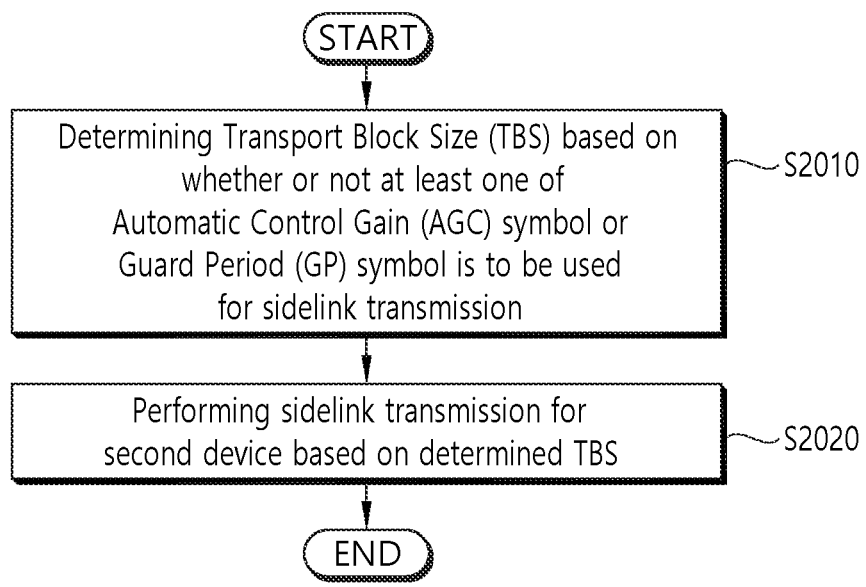
FIG. 20 shows a method for performing, by a first device (100), sidelink transmission according to an embodiment of the present disclosure.

FIG. 20 shows a method for performing, by a first device (100), sidelink transmission according to an embodiment of the present disclosure.

Referring to FIG. 20, in step S2010, a first device (100) may determine a Transport Block Size (TBS) based on whether or not to use one of an Automatic Gain Control (AGC) symbol or a Guard Period (GP) symbol for the sidelink transmission. The AGC symbol may be a symbol that is used, by the first device (100), for AGC, and the GP symbol may be a symbol that is used, by the first device (100), for TX/RX switching. The TBS may be determined by various methods proposed in this specification.

For example, the GP symbol may be a last symbol within a slot including multiple symbols. For example, the first device (100) may determine whether or not to use part of the GP symbol for the sidelink transmission based on a numerology of the slot. For example, if subcarrier spacing being related to the numerology of a slot is less than or equal to a specific value, the first device (100) may determine part of the GP symbol so that it can be used for the sidelink transmission. For example, if subcarrier spacing being related to the numerology of a slot is equal to or greater than a specific value, the first device (100) may determine part of the GP symbol so that it is not used for the sidelink transmission. For example, the specific value may be predefined for the first device (100). For example, the base station may configure or preconfigure the specific value to the first device (100). For example, the first device (100) may determine whether or not to use part of the GP symbol for the sidelink transmission based on latency requirements of a service being transmitted from the slot. For example, the first device (100) may determine whether or not to use part of the GP symbol for the sidelink transmission based on a type of the service that is transmitted from the slot. For example, the first device (100) may determine whether or not to use part of the GP symbol for the sidelink transmission based on a frequency range being related to the slot.

For example, the AGC symbol may be a first symbol within a slot including multiple symbols. For example, the first device (100) may determine whether or not to use part of the AGC symbol for the sidelink transmission based on a numerology of the slot. For example, if subcarrier spacing being related to the numerology of a slot is less than or equal to a specific value, the first device (100) may determine part of the AGC symbol so that it can be used for the sidelink transmission. For example, if subcarrier spacing being related to the numerology of a slot is equal to or greater than a specific value, the first device (100) may determine part of the AGC symbol so that it is not used for the sidelink transmission. For example, the specific value may be predefined for the first device (100). For example, the base station may configure or preconfigure the specific value to the first device (100). For example, the first device (100) may determine whether or not to use part of the AGC symbol for the sidelink transmission based on latency requirements of a service being transmitted from the slot. For example, the first device (100) may determine whether or not to use part of the AGC symbol for the sidelink transmission based on a type of the service that is transmitted from the slot. For example, the first device (100) may determine whether or not to use part of the AGC symbol for the sidelink transmission based on a frequency range being related to the slot.

In step S2010, the first device (100) may perform the sidelink transmission for a second device (200) based on the determined TBS.

Additionally, the first device (100) may transmit, to the second device (200), information indicating that the TBS is determined based on whether or not at least one of the AGC symbol or the GP symbol is to be used for sidelink transmission. The first device (100) may communicate with at least one of mobile UEs, networks or autonomous vehicles other than the first device (100).

The method proposed above may be performed by various devices being described in this specification. For example, a processor (102) of the first device (100) may determine the Transport Block Size (TBS), based on whether or not at least one of the Automatic Gain Control (AGC) symbol or the Guard Period (GP) symbol is to be used for the sidelink transmission. And, the processor (102) of the first device (100) may control a transceiver (106) so that the sidelink transmission can be performed for a second device (200), based on the determined TBS.

Figure 21:
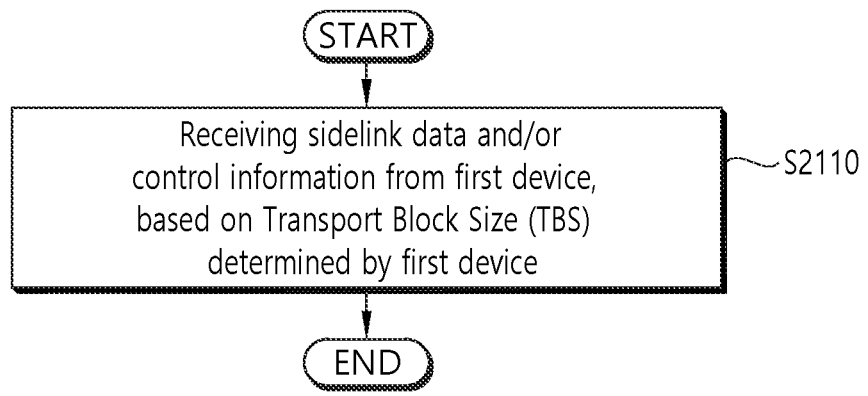
FIG. 21 shows a method for receiving, by a second device (200), sidelink data and/or control information according to an embodiment of the present disclosure.

FIG. 21 shows a method for receiving, by a second device (200), sidelink data and/or control information according to an embodiment of the present disclosure.

Referring to FIG. 21, in step S2110, a second device (200) may receive sidelink data and/or control information from the first device (100), based on a Transport Block Size (TBS), which is determined by the first device (100). The TBS may be determined by various methods proposed in this specification. For example, the TBS may be determined by the first device (100) based on whether or not at least one of the Automatic Gain Control (AGC) symbol or the Guard Period (GP) symbol is to be used for sidelink transmission. The AGC symbol may be a symbol that is used, by the first device (100), for AGC, and the GP symbol may be a symbol that is used, by the first device (100), for TX/RX switching.

The method proposed above may be performed by various devices being described in this specification. For example, a processor (202) of the second device (200) may control a transceiver (206) so that sidelink data and/or control information can be received from the first device (100), based on a Transport Block Size (TBS), which is determined by the first device (100).

According to an embodiment of the present disclosure, in sidelink communication or V2X communication, a UE may efficiently determine a TBS.

Since the examples of the above-described proposed method may also be included as one of the implementation methods of the present disclosure, it will be apparent that the examples of the above-described proposed method can be considered as types of proposed methods. Additionally, although the above-described proposed methods may be independently implemented (or embodied), the implementation may also be carried out in a combined (or integrated) form of part of the proposed methods. Herein, rules may be defined so that information on the application or non-application of the proposed methods (or information on the rules of the proposed methods) can be notified to a UE, by a base station, or to a receiving UE, by a transmitting UE, through a predefined signal (e.g., physical layer signal or high layer signal).

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
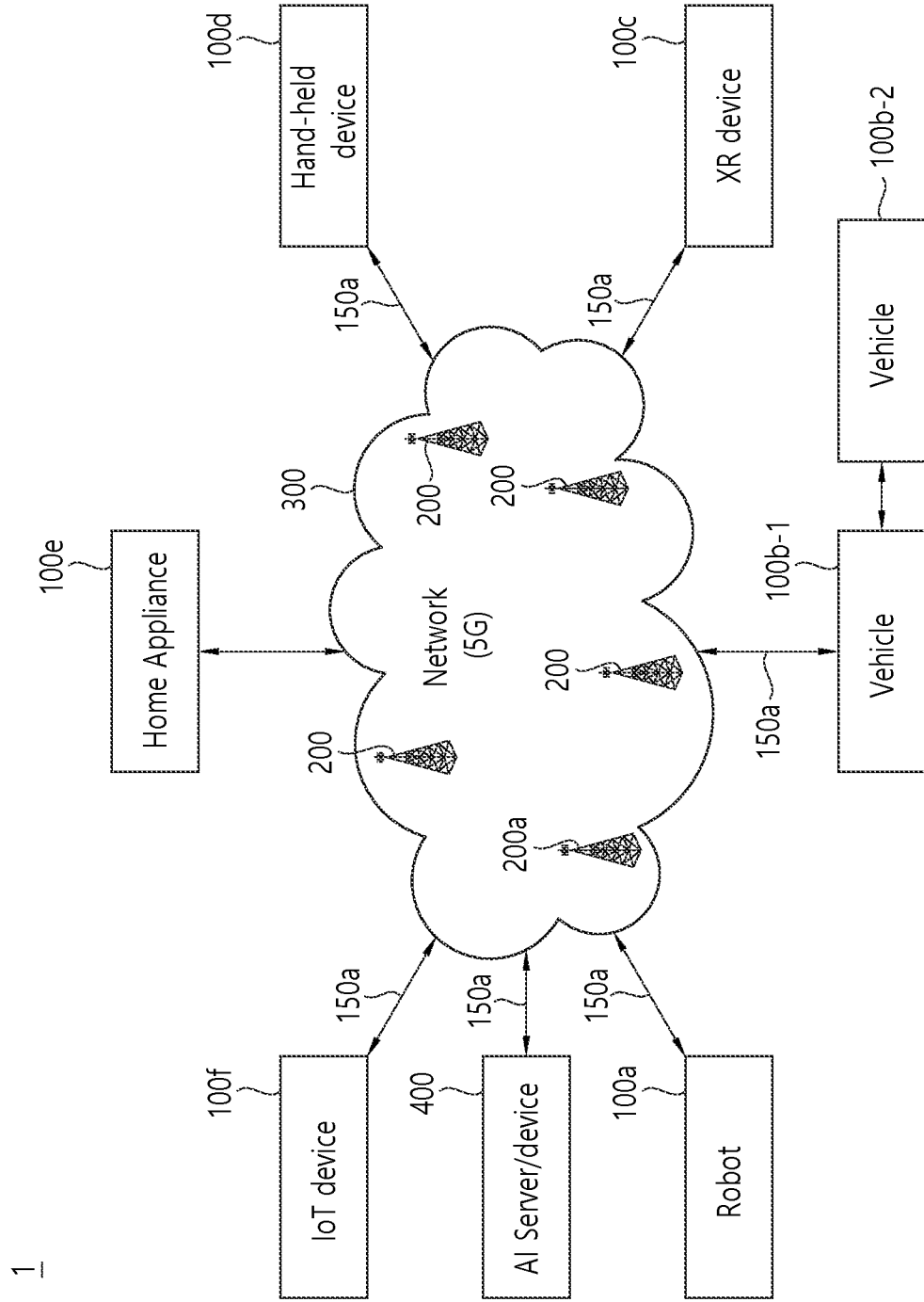
FIG. 22 shows a communication system (1) applied to the present disclosure.

FIG. 22 shows a communication system (1) applied to the present disclosure.

Referring to FIG. 22, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An AI technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b) may be established between the wireless devices (100a~100f)/BS (200), or BS (200)/wireless devices (100a~100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
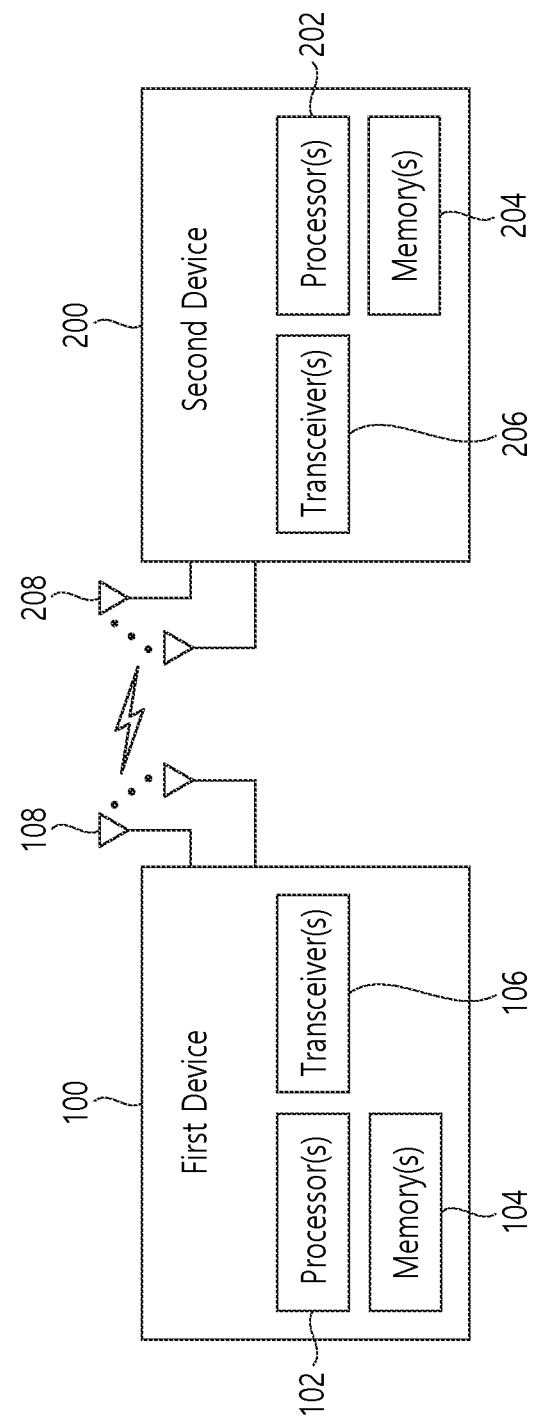
FIG. 23 shows wireless devices applicable to the present disclosure.

FIG. 23 shows wireless devices applicable to the present disclosure.

Referring to FIG. 23, a first wireless device (100) and a second wireless device (200) may transmit radio signals through a variety of RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 22.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 24:
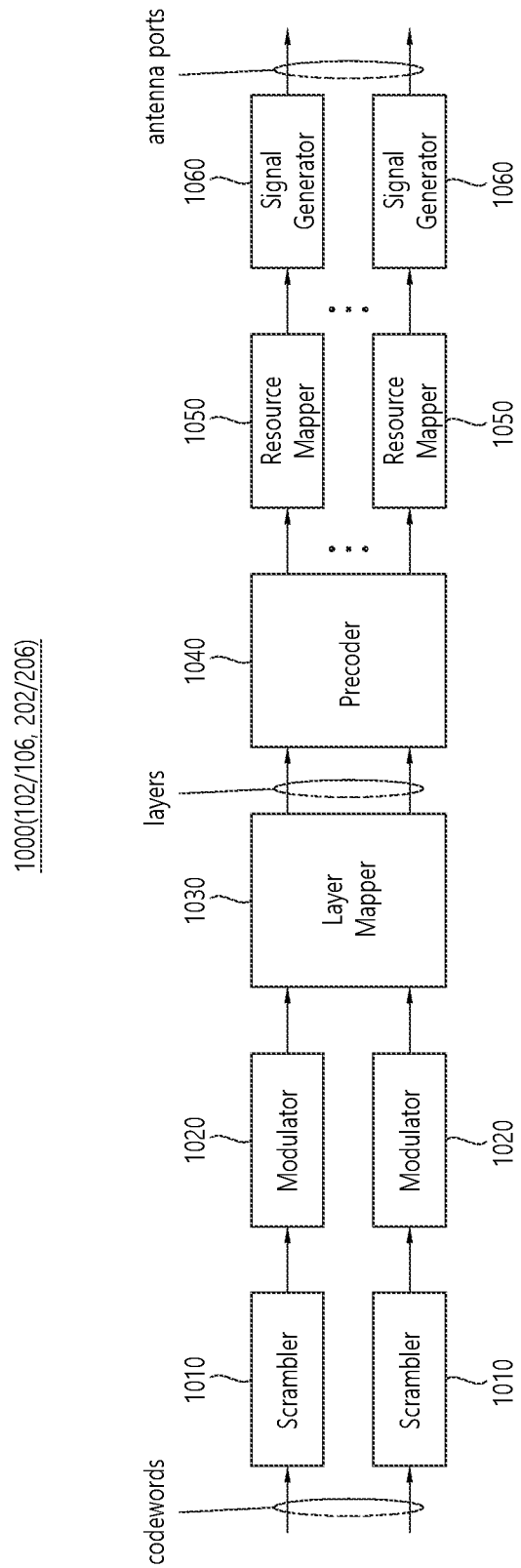
FIG. 24 shows a signal process circuit for a transmission signal.

FIG. 24 shows a signal process circuit for a transmission signal.

Referring to FIG. 24, a signal processing circuit (1000) may include scramblers (1010), modulators (1020), a layer mapper (1030), a precoder (1040), resource mappers (1050), and signal generators (1060). An operation/function of FIG. 24 may be performed, without being limited to, the processors (102, 202) and/or the transceivers (106, 206) of FIG. 23. Hardware elements of FIG. 24 may be implemented by the processors (102, 202) and/or the transceivers (106, 206) of FIG. 23. For example, blocks 1010~1060 may be implemented by the processors (102, 202) of FIG. 23. Alternatively, the blocks 1010 to 1050 may be implemented by the processors (102, 202) of FIG. 23 and the block 1060 may be implemented by the transceivers (106, 206) of FIG. 23.

Codewords may be converted into radio signals via the signal processing circuit (1000) of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 24. For example, the wireless devices (e.g., 100, 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
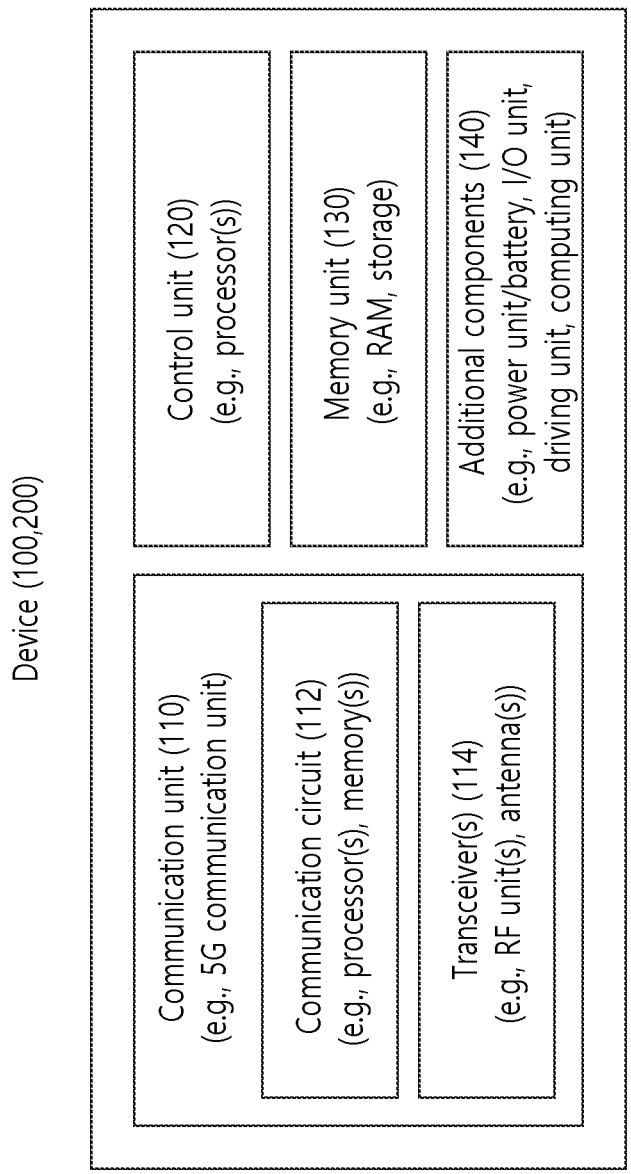
FIG. 25 shows another example of a wireless device applied to the present disclosure.

FIG. 25 shows another example of a wireless device applied to the present disclosure. The wireless device may be implemented in various forms according to a use-case/service (refer to FIG. 22 and FIGS. 26 to 31).

Referring to FIG. 25, wireless devices (100, 200) may correspond to the wireless devices (100, 200) of FIG. 23 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 23. For example, the transceiver(s) (114) may include the one or more transceivers (106, 206) and/or the one or more antennas (108, 208) of FIG. 23. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 22), the vehicles (100b-1, 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, and so on. The wireless device may be used in a mobile or fixed place according to a use-example/service.

In FIG. 25, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
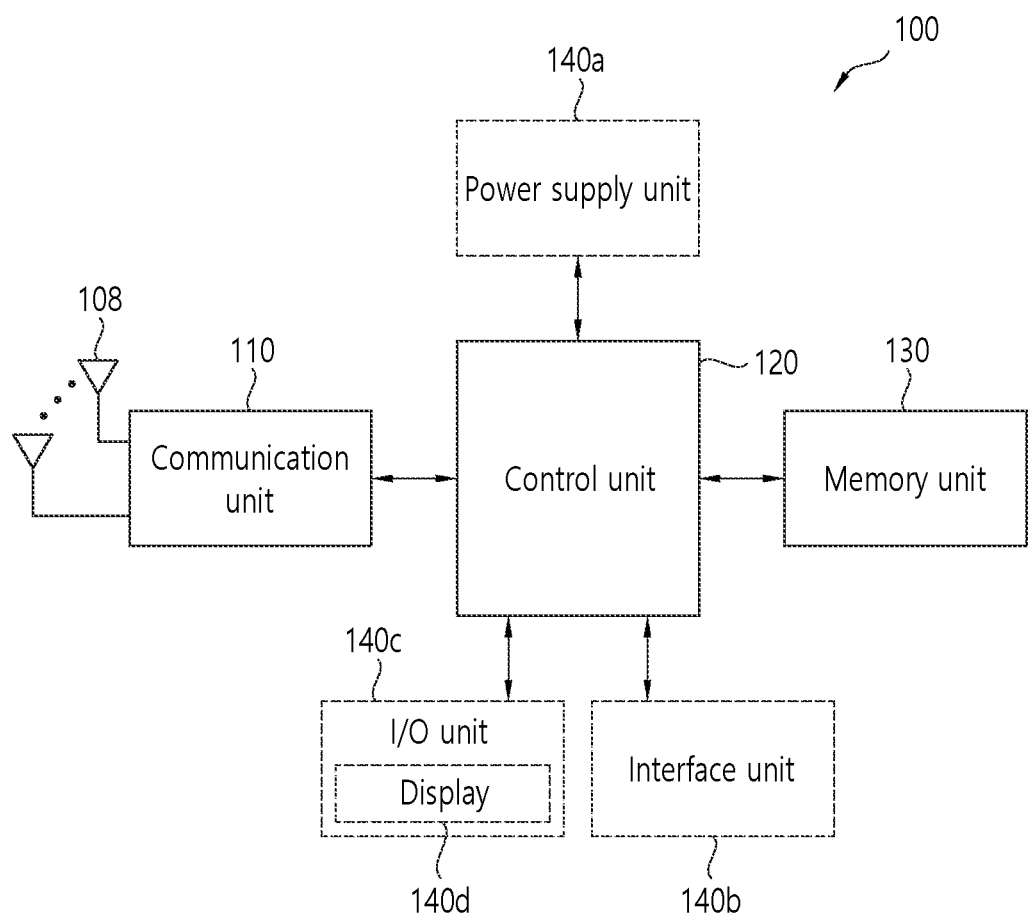
FIG. 26 shows a hand-held device applied to the present disclosure.

FIG. 26 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110-130/140a-140c correspond to the blocks 110~130/140 of FIG. 25, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 27:
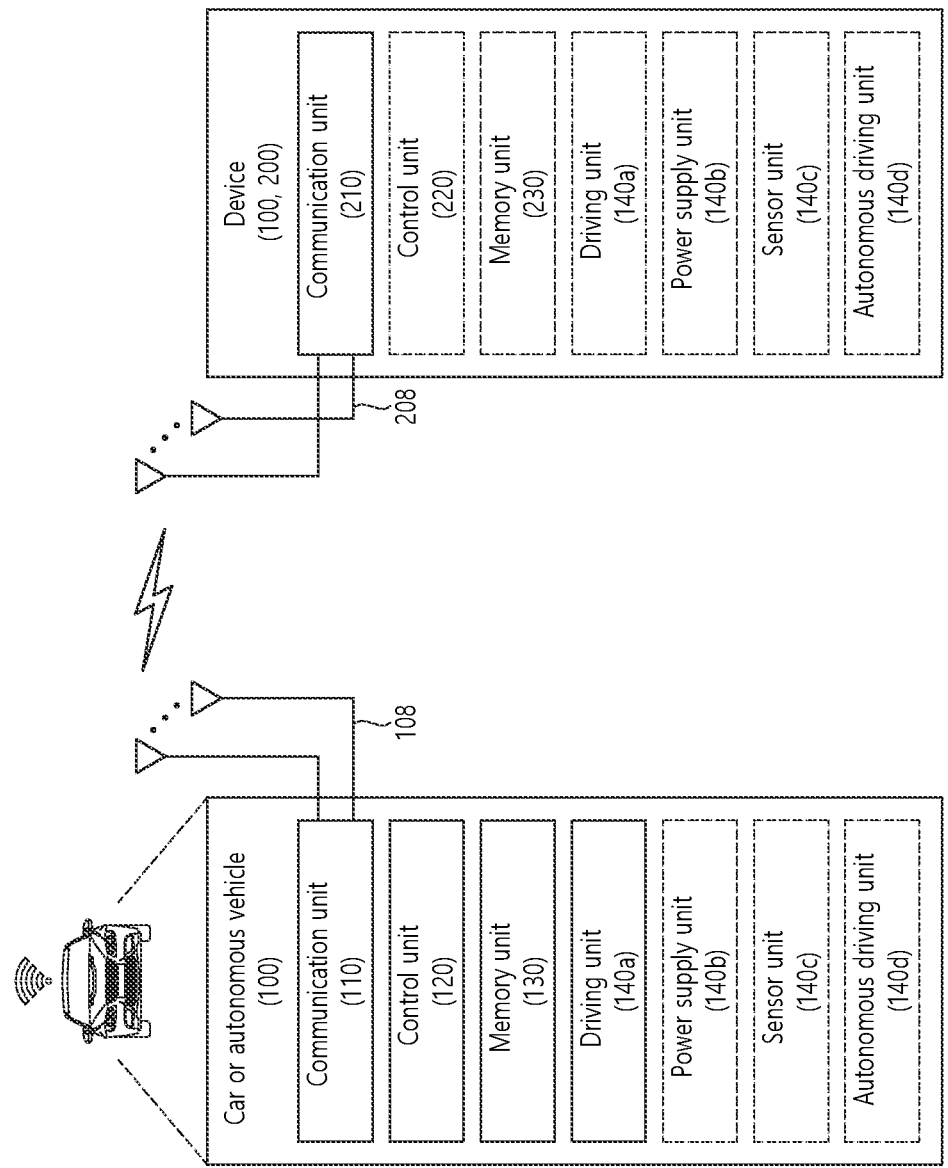
FIG. 27 shows a vehicle or an autonomous driving vehicle applied to the present disclosure.

FIG. 27 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, and so on.

Referring to FIG. 27, a vehicle or autonomous driving vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 25, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous driving vehicle (100). The control unit (120) may include an Electronic Control Unit (ECU). The driving unit (140a) may cause the vehicle or the autonomous driving vehicle (100) to drive on a road. The driving unit (140a) may include an engine, a motor, a powertrain, a wheel, a brake, a steering device, and so on. The power supply unit (140b) may supply power to the vehicle or the autonomous driving vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140*d*) may generate an autonomous driving path and a driving plan from the obtained data. The control unit (120) may control the driving unit (140*a*) such that the vehicle or the autonomous driving vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

Figure 28:
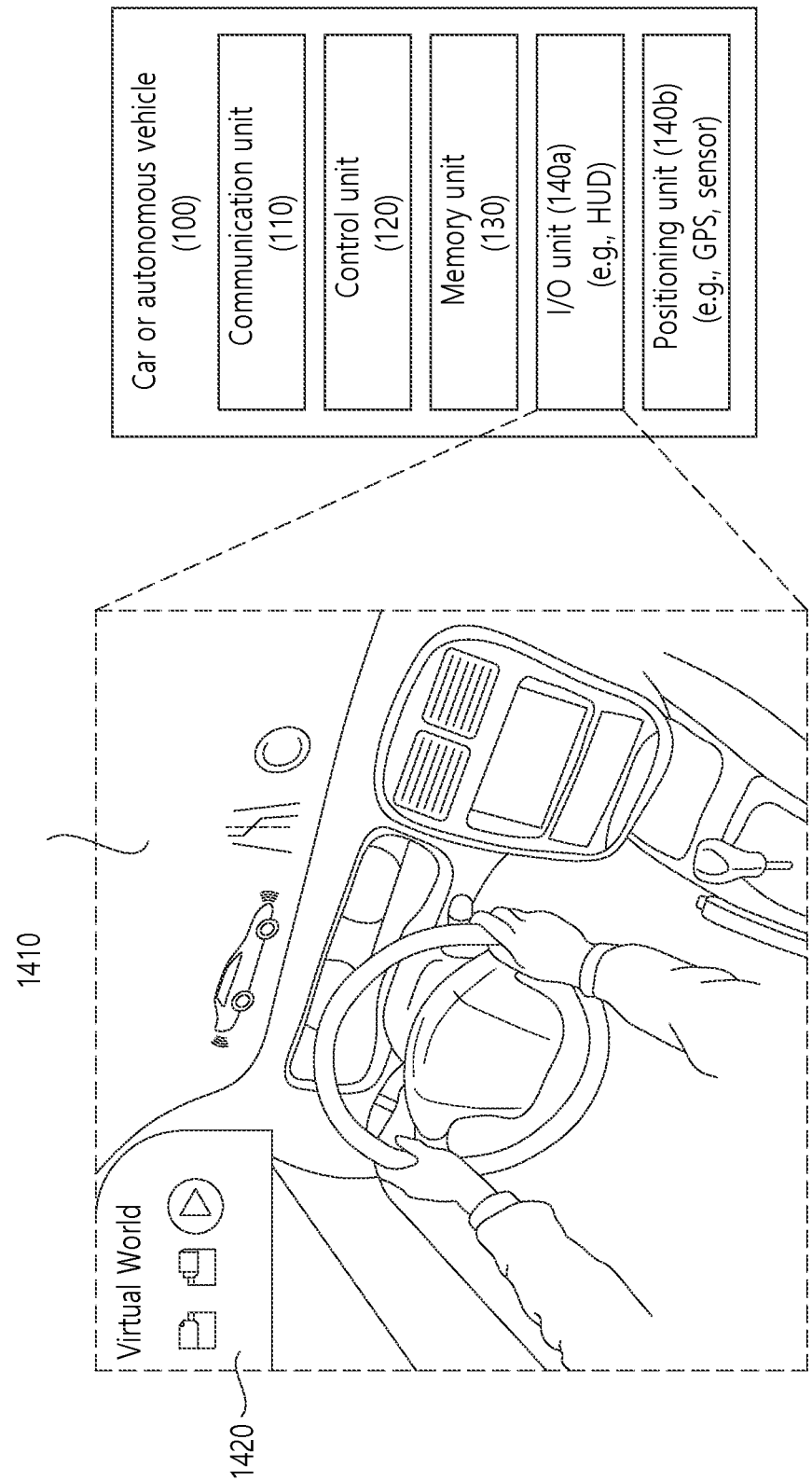
FIG. 28 shows a vehicle applied to the present disclosure.

FIG. 28 shows a vehicle applied to the present disclosure. The vehicle may be implemented as a transport means, an aerial vehicle, a ship, and so on.

Referring to FIG. 28, a vehicle (100) may include a communication unit (110), a control unit (120), a memory unit (130), an I/O unit (140*a*), and a positioning unit (140*b*). Herein, the blocks 110 to 130/140*a*~140*b* correspond to blocks 110 to 130/140 of FIG. 25.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include a HUD. The positioning unit (140*b*) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 29:
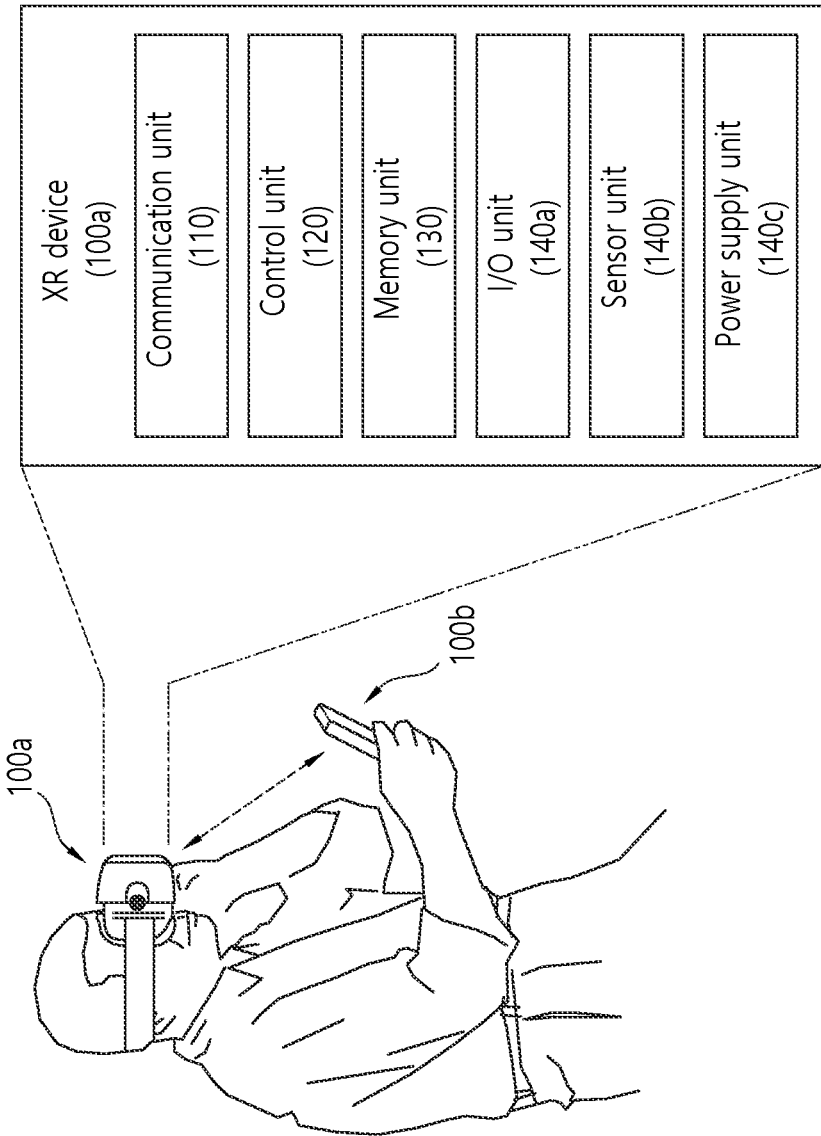
FIG. 29 shows an XR device applied to the present disclosure.

FIG. 29 shows an XR device applied to the present disclosure. The XR device may be implemented by an HMD, a HUD mounted in a vehicle, a television, a smartphone, a computer, a wearable device, a home appliance, a digital signage, a vehicle, a robot, and so on.

Referring to FIG. 29, an XR device (100*a*) may include a communication unit (110), a control unit (120), a memory unit (130), an I/O unit (140*a*), a sensor unit (140*b*), and a power supply unit (140*c*). Herein, the blocks 110 to 130/140*a*-140*c* correspond to the blocks 110 to 130/140 of FIG. 25, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, and so on. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, and so on.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device (100*b*)) or a media server through the communication unit (130). The communication unit (130) may download/stream content such as films or news from another device (e.g., the hand-held device (100*b*)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100*a*) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 30:
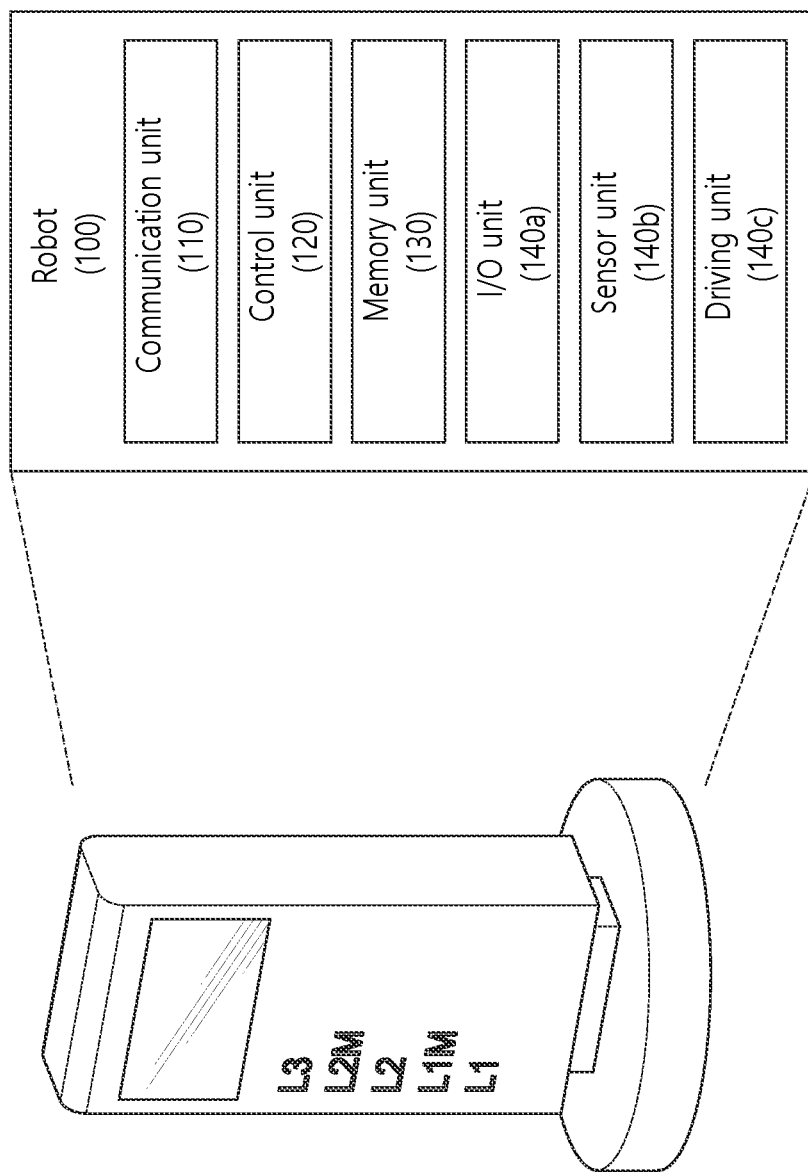
FIG. 30 shows a robot applied to the present disclosure.

FIG. 30 shows a robot applied to the present disclosure. The robot may be categorized into an industrial robot, a medical robot, a household robot, a military robot, and so on, according to a used purpose or field.

Referring to FIG. 30, a robot (100) may include a communication unit (110), a control unit (120), a memory unit (130), an I/O unit (140a), a sensor unit (140b), and a driving unit (140c). Herein, the blocks 110 to 130/140a-140c correspond to the blocks 110 to 130/140 of FIG. 25, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 31:
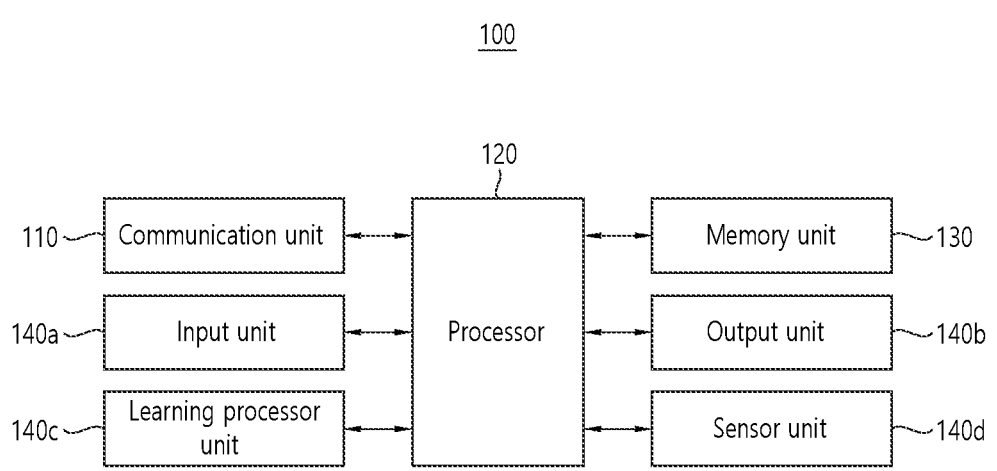
FIG. 31 shows an AI device applied to the present disclosure.

FIG. 31 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 31, an AI device (100) may include a communication unit (110), a control unit (120), a memory unit (130), an I/O unit (140a/140b), a learning processor unit (140c), and a sensor unit (140d). The blocks 110 to 130/140a-140d correspond to blocks 110 to 130/140 of FIG. 25, respectively.

The communication unit (110) may transmit and receive wired/radio signals (e.g., sensor information, user input, learning models, or control signals) to and from external devices such as other AI devices (e.g., 100x, 200, 400 of FIG. 22) or an AI server (200) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 22). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 22). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method for performing, by a first apparatus, wireless communication, the method comprising:
    determining a number of resource elements (REs) allocated for a physical sidelink shared channel (PSSCH) within one slot and one physical resource block (PRB);
    determining a transport block size (TBS) based on the number of REs; and
    based on the TBS, performing sidelink (SL) transmission to a second apparatus,
    wherein the number of REs is determined based on a value obtained by subtracting an overhead value from a value obtained by multiplying 2 subtracted from a number of SL symbols within the one slot with a number of subcarriers within the one PRB.

2. The method of claim 1, wherein the overhead value includes an overhead value configured by an upper layer parameter and a number of REs related to demodulation reference signal (DMRS).

3. The method of claim 1, wherein the number of subcarriers within the one PRB is 12.

4. The method of claim 1, wherein information related to the number of SL symbols within the one slot is received from a base station.

5. The method of claim 1, wherein the number of REs ($N'_{RE}$) is obtained based on the following equation, $$N'_{RE}=N^{RB}_{sc} \cdot (N^{sh}_{symb}-2)-N_{DMRS}-N_{Oh}$$

wherein the $N^{RB}_{sc}$ is 12, the $N^{sh}_{symb}$ is the number of SL symbols within the one slot, the $N_{DMRS}$ is a number of REs related to demodulation reference signal (DMRS), and the $N_{Oh}$ is an overhead configured by a higher layer parameter.

6. The method of claim 5, wherein the $Ns^h_{symb} - 2$ is a value obtained by subtracting a number of symbols related to automatic gain control (AGC) and a number of symbols related to guard period (GP) from the number of SL symbols within the one slot.

7. The method of claim 6, wherein the symbol related to the GP is a last symbol among the SL symbols within the one slot.

8. The method of claim 6, wherein the symbol related to the AGC is a first symbol among the SL symbols within the one slot.

9. The method of claim 1, wherein determining the TBS based on the number of REs includes: (i) obtaining an intermediate number related to the TBS by multiplying the number of REs, code rate, modulation order, and a number of layers, (ii) quantizing the intermediate number, and (iii) determining the TBS based on the quantized intermediate number.

10. A first apparatus for performing wireless communication, the first apparatus comprising:
one or more memories storing instructions;
one or more transceivers; and
one or more processors connected to the one or more memories and the one or more transceivers, wherein the one or more processors execute the instructions to:
determine a number of resource elements (REs) allocated for a physical sidelink shared channel (PSSCH) within one slot and one physical resource block (PRB);
determine a transport block size (TBS) based on the number of REs; and
based on the TBS, perform sidelink (SL) transmission to a second apparatus,
wherein the number of REs is determined based on a value obtained by subtracting an overhead value from a value obtained by multiplying 2 subtracted from a number of SL symbols within the one slot with a number of subcarriers within the one PRB.

11. The first apparatus of claim 10, wherein the overhead value includes an overhead value configured by an upper layer parameter and a number of REs related to demodulation reference signal (DMRS).

12. The first apparatus of claim 10, wherein the number of subcarriers within the one PRB is 12.

13. The first apparatus of claim 10, wherein information related to the number of SL symbols within the one slot is received from a base station.

14. The first apparatus of claim 10, wherein the number of REs ($N'_{RE}$) is obtained based on the following equation, $$N'_{RE}=N^{RB}_{sc} \cdot (N^{sh}_{symb}-2)-N_{DMRS}-N_{Oh}$$

wherein the $N^{RB}_{sc}$ is 12, the $N^{sh}_{symb}$ is the number of SL symbols within the one slot, the $N_{DMRS}$ is a number of REs related to demodulation reference signal (DMRS), and the $N_{Oh}$ is an overhead configured by a higher layer parameter.

15. An apparatus configured to control a first user equipment (UE), the apparatus comprising:
one or more processors; and
one or more memories operably connected to the one or more processors and storing instructions, wherein the one or more processors execute the instructions to:
determine a number of resource elements (REs) allocated for a physical sidelink shared channel (PSSCH) within one slot and one physical resource block (PRB);
determine a transport block size (TBS) based on the number of REs; and
based on the TBS, perform sidelink (SL) transmission to a second UE,
wherein the number of REs is determined based on a value obtained by subtracting an overhead value from a value obtained by multiplying 2 subtracted from a number of SL symbols within the one slot with a number of subcarriers within the one PRB.

16. The apparatus of claim 15, wherein the overhead value includes an overhead value configured by an upper layer parameter and a number of REs value related to demodulation reference signal (DMRS).

17. The apparatus of claim 15, wherein the number of subcarriers within the one PRB is 12.

18. The apparatus of claim 15, wherein information related to the number of SL symbols within the one slot is received from a base station.

19. The apparatus of claim 15, wherein the number of REs ($N'_{RE}$) is obtained based on the following equation, $$N'_{RE}=N^{RB}_{sc} \cdot (N^{sh}_{symb}-2)-N_{DMRS}-N_{Oh}$$

wherein the $N^{RB}_{sc}$ is 12, the $N^{sh}_{symb}$ is the number of SL symbols within the one slot, the $N_{DMRS}$ is a number of REs related to demodulation reference signal (DMRS), and the Non is an overhead configured by a higher layer parameter.

20. The apparatus of claim 19, wherein the $N^{sh}_{symb}-2$ is a value obtained by subtracting a number of symbols related to automatic gain control (AGC) and a number of symbols related to guard period (GP) from the number of SL symbols within the one slot.

* * * * *